United States Patent [19]
Masaki

[11] Patent Number: 5,521,987
[45] Date of Patent: May 28, 1996

[54] IMAGE PROCESSING METHOD AND APPARATUS EMPLOYING GRAY SCALE IMAGES HAVING FEWER BITS PER PIXEL AND GRAY SCALE IMAGE RESTORATION USING SMALL AREAS OF AN IMAGE WINDOW

[75] Inventor: Toshimichi Masaki, Takatsuki, Japan

[73] Assignee: Omron Corporation, Kyoto, Japan

[21] Appl. No.: 251,966

[22] Filed: Jun. 1, 1994

[30] Foreign Application Priority Data

Jun. 4, 1993 [JP] Japan .................................. 5-160128

[51] Int. Cl.$^6$ ...................................................... G06K 9/80
[52] U.S. Cl. ........................... 382/218; 382/252; 382/270; 382/299
[58] Field of Search ................................. 382/209, 216, 382/218, 237, 251, 252, 270, 296, 298, 299; 358/456, 457; 348/161

[56] References Cited

U.S. PATENT DOCUMENTS

| | | | |
|---|---|---|---|
| 3,614,736 | 10/1971 | McLaughlin et al. | 340/146.3 Q |
| 4,468,809 | 8/1984 | Grabowski et al. | 382/50 |
| 4,658,428 | 4/1987 | Bedros et al. | 382/30 |
| 4,893,346 | 1/1990 | Bishop | 382/8 |
| 5,046,109 | 9/1991 | Fujimori et al. | 382/8 |
| 5,051,844 | 9/1991 | Sullivan | 358/456 |
| 5,208,871 | 5/1993 | Eschbach | 382/41 |

OTHER PUBLICATIONS

Proceedings of the IEEE Computer Society Conference on Computer Vision and Pattern Recognition, Washington, DC, Jun. 1983, pp. 432–441, Glazer, et al., "Scene matching by hierarchical correlation".

IEEE Transaction on Communication, Dec. 1981, vol. COM-29, No. 12, ISSN 0090-6778, pp. 1898–1925, Stoffel, et al. "A Survey of Electronic Technioques For Pictorial Image Reproduction".

Primary Examiner—Leo Boudreau
Assistant Examiner—Andrew W. Johns
Attorney, Agent, or Firm—Dickstein, Shapiro & Morin

[57] ABSTRACT

Input image data representing the image of a subject imaged by a video camera 9 is applied from an A/D converter circuit 11 to a dither-image generating circuit 13, in which the image data is binarized in accordance with the error diffusion method, whereby dither image data represented by one bit per pixel is obtained. A plurality of small areas each comprising a plurality of pixels are set within a window caused to scan the dither image, and the dither image data is summed in each and every small area by an image restoration circuit 14, whereby gray-level image data, in which each small area serves as one pixel, is restored. Difference or correlation values between the restored image data and text data set in advance with regard to standard images which are different from one another are calculated, for the window at each and every position, by arithmetic circuits 15a~15k. The smallest difference or the largest correlation values and the positions of the windows in which this smallest difference or the largest correlation values are produced are respectively sensed by corresponding peak holding circuits 16a~16k.

41 Claims, 22 Drawing Sheets

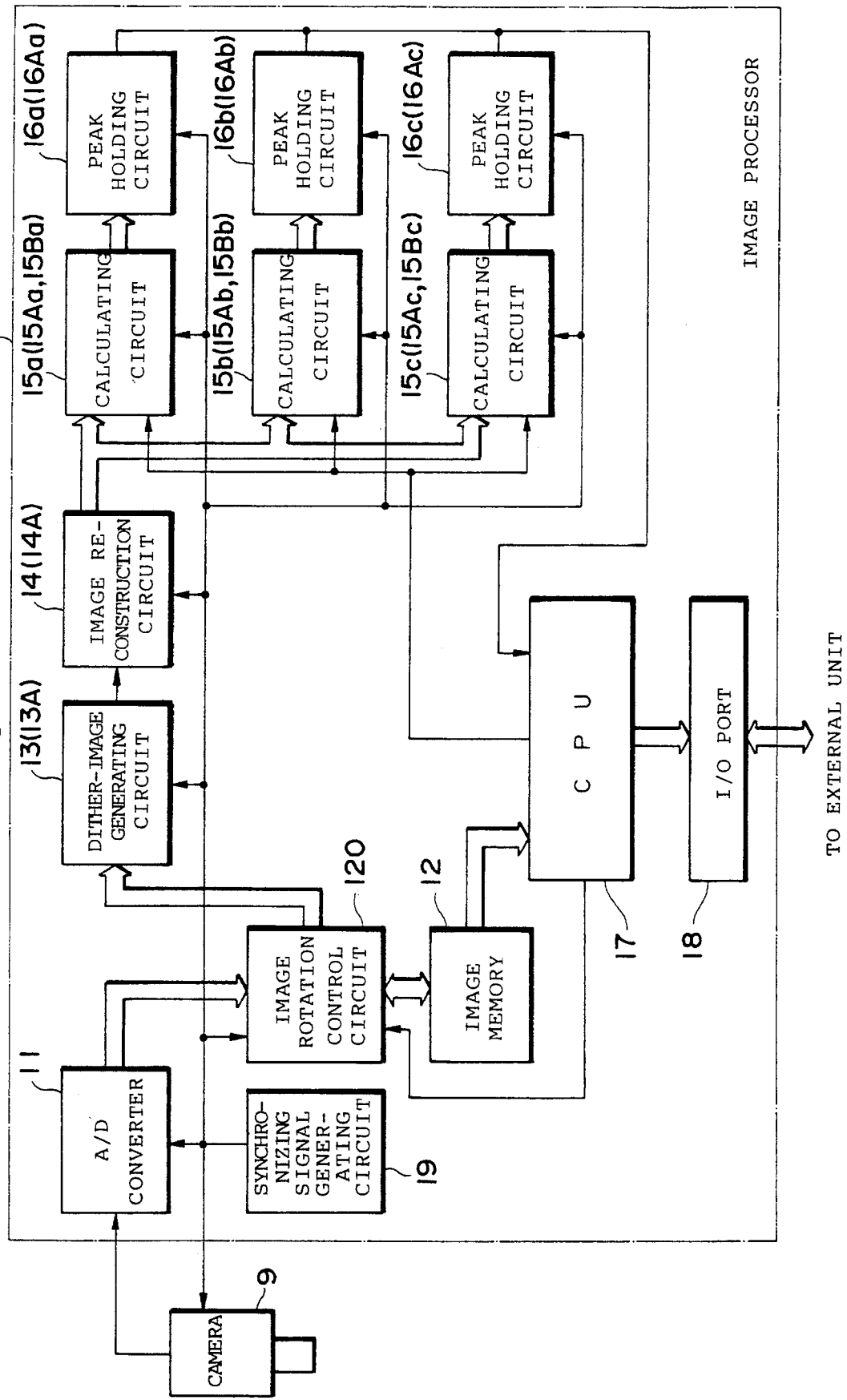

IMAGE PROCESSING METHOD AND APPARATUS EMPLOYING GRAY SCALE IMAGES HAVING FEWER BITS PER PIXEL AND GRAY SCALE IMAGE RESTORATION USING SMALL AREAS OF AN IMAGE WINDOW

BACKGROUND OF THE INVENTION

1. Field of the Invention

This invention relates to an image processor and an image processing method for performing pattern-matching processing and the like for the purposes of object recognition, judging whether a standard image of a prescribed model exists in the image of a subject, and so on.

2. Background Art

A technique available for pattern matching involves setting a window on image data obtained by imaging a subject, and calculating a degree of coincidence or a degree of similarity between partial image data within the window and standard image data registered in advance. By executing the above-described processing with regard to the window at each position thereof, while the window is made to scan within a picture, a window containing partial image data exhibiting the highest degree of coincidence or similarity is detected, thereby making it possible to recognize a position at which an image identical or similar to the standard image exists. Thus, various types of measurement processing can be executed with regard to image data within a specified window.

Image data generally is represented by eight or more bits per pixel. Line memories are used in order to extract image data within a set window at a video rate. The line memories, the number of which corresponds to the number of pixels in the vertical direction of the window, are connected in cascade, and image data is transferred among the line memories in synchronism with a clock signal. By extracting image data at one time from a prescribed position of each line memory, e.g., the terminus of the line memory, one column of image data in the vertical direction of the window is obtained.

In an image processor having such a configuration, a problem encoutered is that a large number line memories of at least eight bits each must be provided, as a result of which there is an increase in the scale of the hardware. Further, pattern-matching processing using eight bits per pixel is required. When this is implemented by hardware, the scale of the circuitry is similarly increased. If it is attempted to implement the foregoing by software, more complicated processing results.

SUMMARY OF THE INVENTION

A main object of the present invention is to provide an image processor and an image processing method which uses less hardware.

Another object of the present invention is to simplify pattern-matching processing.

A further object of the present invention is to provide an image processor and an image processing method capable of judging whether the image of a subject includes a pattern which coincides with at least one of a plurality of standard image patterns previously set, or whether a standard image pattern is found in images which are created by rotating or enlarging or reducing the image of a subject.

An image processor according to the first aspect of the present invention comprises: pseudo-gray-scale image generating circuit means for converting input image data, which is represented by a first prescribed number of bits per pixel, into pseudo-gray-scale image data represented by a second prescribed number of bits, which is less than the first prescribed number of bits; image restoration circuit means for restoring the pseudo-gray-scale image data generated by the pseudo-gray-scale image generating circuit means for each and every one of a plurality of small areas, each of which comprises a plurality of pixels and is provided in a window that scans the pseudo-gray-scale image generated by the pseudo-gray-scale image generating circuit means, with said each small area serving as one restored pixel, and outputting restored image data for a window at each and every position; and a plurality of similarity operating circuit means, which operate in parallel, each for calculating an index value representing a degree of similarity between the restored image data of each window sequentially outputted by the image restoration circuit means and text data representing a standard image set in advance, the standard images for the plurality of similarity operating circuit means being different from one another.

In accordance with the present invention, input image data is converted into pseudo-gray-scale image data, and the number of bits per pixel of the image data is reduced by a wide margin. As a result, it is possible to greatly reduce the number of bits of line memories used when pseudo-gray-scale image data within a window is extracted at a video rate. Accordingly, the scale of hardware circuitry can be reduced and cost can be lowered.

Further, gray-scale image data is restored by summing pseudo-gray-scale image data for each and every small area provided in a window. One pixel of restored image data is equal to the size of the small area. Accordingly, the number of pixels of restored image data is reduced so that processing (processing for calculating a similarity index value) for pattern matching with text data is simplified. This leads to smaller scale circuitry in the case of hardware and to simplification of processing in the case of software. Since the lightness distribution of the input image data is substantially preserved in the restored image data, the precision of pattern matching can be maintained.

The pseudo-gray-scale image data is represented by one, two or more bits per pixel, as mentioned above. Though lightness resolution is higher the larger the number of bits, the scale of circuitry is greater in such a case. For practical reasons, therefore, the number of bits should be set appropriately. The size of the small areas has an effect upon spatial resolution and lightness resolution. The size of the small areas also should be determined based upon practical considerations.

The window scanning the pseudo-gray-scale image can be dispensed with in a case where a position of the image portion to be searched is known in advance or the entire image of a subject is subjected to a pattern-matching processing. This is true of image processors and image processing methods according to the second and third aspects of the present invention.

In an embodiment of the present invention, the standard images are images of models which are different from one another.

In another embodiment of the present invention, the standard images are formed based on a single model so that rotational angles or sizes are different from one another.

In a preferred embodiment of the present invention, judging means are further provided for determining whether a subject image represented by the input image data coincides with at least one of the standard images on the basis of the index values calculated by the plurality of the similarity operating circuit means.

According to the first aspect of the present invention, a plurality of similarity operating circuit means are provided so that index values representing degrees of similarities for a plurality of standard images can be obtained together at the same time, resulting in achieving high speed processing. Further it can be judged whether a subject image coincides with at least one of the standard images, or whether a standard image is found in images created by rotating or enlarging or reducing the subject image.

An image processor according to the second aspect of the present invention comprises: converting means for converting input image data into image data representing images different in rotational angle or in size from the image represented by the input image data in sequence at a predetermined period of time; pseudo-gray-scale image generating circuit means for converting the image data converted by the converting means and represented by a first prescribed number of bits per pixel, every time the converted image data is supplied from the converting means, into pseudo-gray-scale image data represented by a second prescribed number of bits, which is less than the first prescribed number of bits; image restoration circuit means for restoring the pseudo-gray-scale image data for each and every one of a plurality of small areas, each of which comprises a plurality of pixels and is provided in a window that scans the pseudo-gray-scale image generated by the pseudo-gray-scale image generating circuit means, with said each small area serving as one restored pixel, every time the pseudo-gray-scale image data is supplied from the pseudo-gray-scale image generating circuit means and outputting restored image data for a window at each and every position; and similarity operating circuit means for calculating an index value representing a degree of similarity between the restored image data of each window sequentially outputted by the image restoration circuit means and text data representing a standard image set in advance, every time the restored image data is outputted by the image restoration circuit means.

According to the second aspect of the present invention, the converting means converts input image data into a plurality items of image data representing images different in rotation angle or in size from the input image in sequence. It is not necessary to arrange a plurality of similarity operating circuit means as the first aspect of the present invention. Accordingly, the hardware construction can be simplified, although the time required for the entire processing becomes relatively longer. It can be judged whether a standard image is found in images which are produced by rotating or enlarging or reducing the subject image, using one standard image.

An image processor according to the third aspect of the present invention comprises: converting means for converting input image data into image data representing images different in rotational angle or in size from the image represented by the input image data in sequence at a predetermined period of time; pseudo-gray-scale image generating circuit means for converting the image data converted by the converting means and represented by a first prescribed number of bits per pixel, every time the converted image data is supplied from said converting means, into pseudo-gray-scale image data represented by a second prescribed number of bits, which is less than the first prescribed number of bits; image restoration circuit means for restoring the pseudo-gray-scale image data for each and every one of a plurality of small areas, each of which comprises a plurality of pixels and is provided in a window that scans the pseudo-gray-scale image generated by the pseudo-gray-scale image generating circuit means, with said each small area serving as one restored pixel, every time the pseudo-gray-scale image data is supplied from the pseudo-gray-scale image generating circuit means and outputting restored image data for a window at each and every position; and a plurality of similarity operating circuit means, which operate in parallel, each for calculating an index value representing a degree of similarity between the restored image data of each window sequentially outputted by the image restoration circuit means and text data representing a standard image set in advance, every time the restored image data is outputted by the image restoration circuit means, the standard images for the plurality of similarity operating circuit means being formed based on a single model and different in rotational angle or in size from one another.

According to the third aspect of the present invention, a hardware construction is simplified in comparison with the first aspect of the present invention and the entire processing time period can be shortened in comparison with the third aspect of the present invention.

The present invention provides for methods of image processings performed in the image processors described above.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 25 is a block diagram illustrating the overall configuration of an image processor according to a third embodiment.

DESCRIPTION OF THE PREFERRED EMBODIMENTS

First Embodiment

Figure 1:
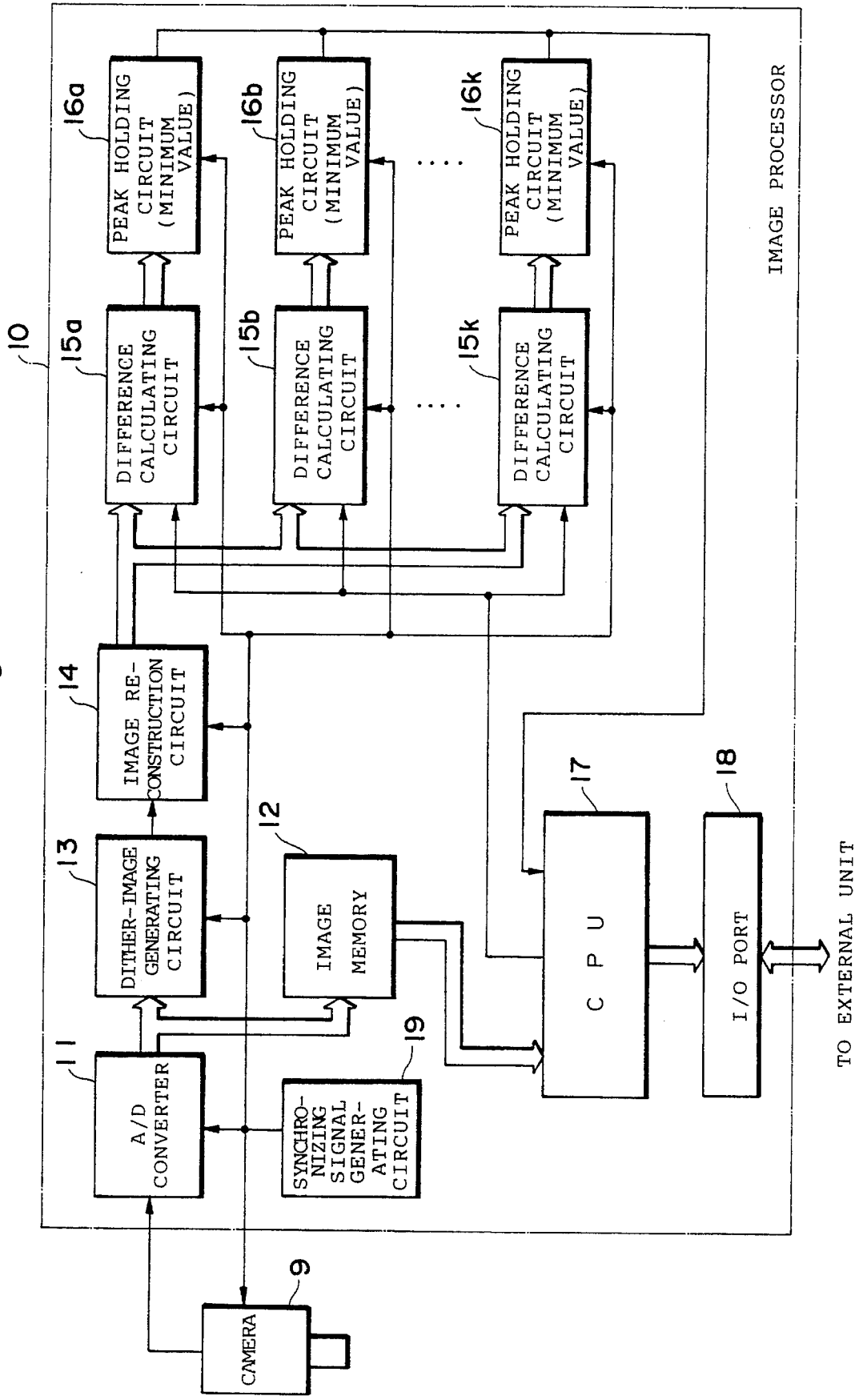
FIG. 1 is a block diagram illustrating the overall configuration of an image processor according to a first embodiment.

FIG. 1 is a block diagram illustrating the overall configuration of an image processor according to a first embodiment.

An image processor 10 includes an A/D converter 11, an image memory 12, a dither-image generating circuit 13, an image restoration circuit 14, a plurality of difference calculating circuits 15a, 15b, . . . , 15k, a plurality of peak holding circuits 16a, 16b, . . . , 16k, a CPU 17 and an I/O port 18.

Figure 2:
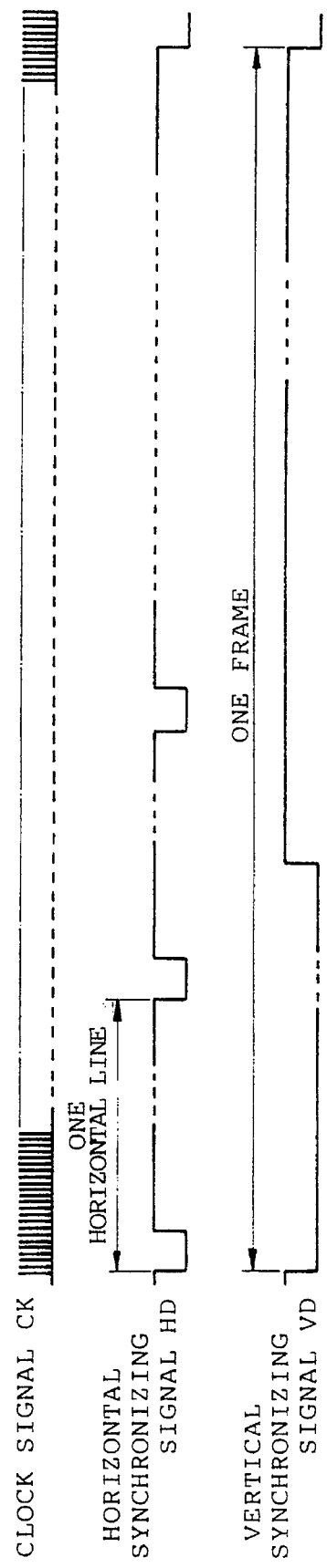
FIG. 2 is a waveform diagram showing a clock signal, a horizontal synchronizing signal and a vertical synchronizing signal.

A synchronizing signal generating circuit 19 of the image processor 10 generates a clock signal CK, a horizontal synchronizing signal HD and a vertical synchronizing signal VD (these signals shall be referred to collectively as "synchronizing signals") of the kind shown in FIG. 2. The synchronizing signals are applied to a video camera 9, the A/D converter 11, the dither-image generating circuit 13, the image restoration circuit 14, the difference calculating circuits 15a~15k and the peak holding circuits 16a~16k. The clock signal CK, one pulse of which is outputted per pixel of image data, serves as a sampling clock signal.

The video camera or television camera 9 picks up the image of a subject and outputs an analog video signal, which represents the image of the subject, in synchronism with the applied synchronizing signals. The analog video signal is applied to the A/D converter 11 of the image processor 10.

The A/D converter 11 converts the entering analog video signal into digital image data. In this embodiment, the digital image data is represented by eight bits. That is, a gray-scale image of 256 levels is expressed by this image data. The digital image data is applied to and stored in the image memory 12 and is also fed into the dither-image generating circuit 13.

The dither-image generating circuit 13 quantizes the entering eight-bit digital image data using the error diffusion method and obtains binary image (dither image) data of the type perceived as a tone when viewed overall. The dither image data is applied to the image restoration circuit 14.

In the image processor 10 of this embodiment, the degree of similarity between a partial image, which is extracted from the input image (the image picked up by the camera 9) while successively changing position, and each of given standard images (standard patterns or model images) is calculated, and the position, in the input image, of the partial image having the highest degree of similarity is determined. Identification of the position is not necessarily needed. In this embodiment, a difference in lightness or a difference in density (these shall be referred to as "differences") is used as an index of similarity.

Figure 3:
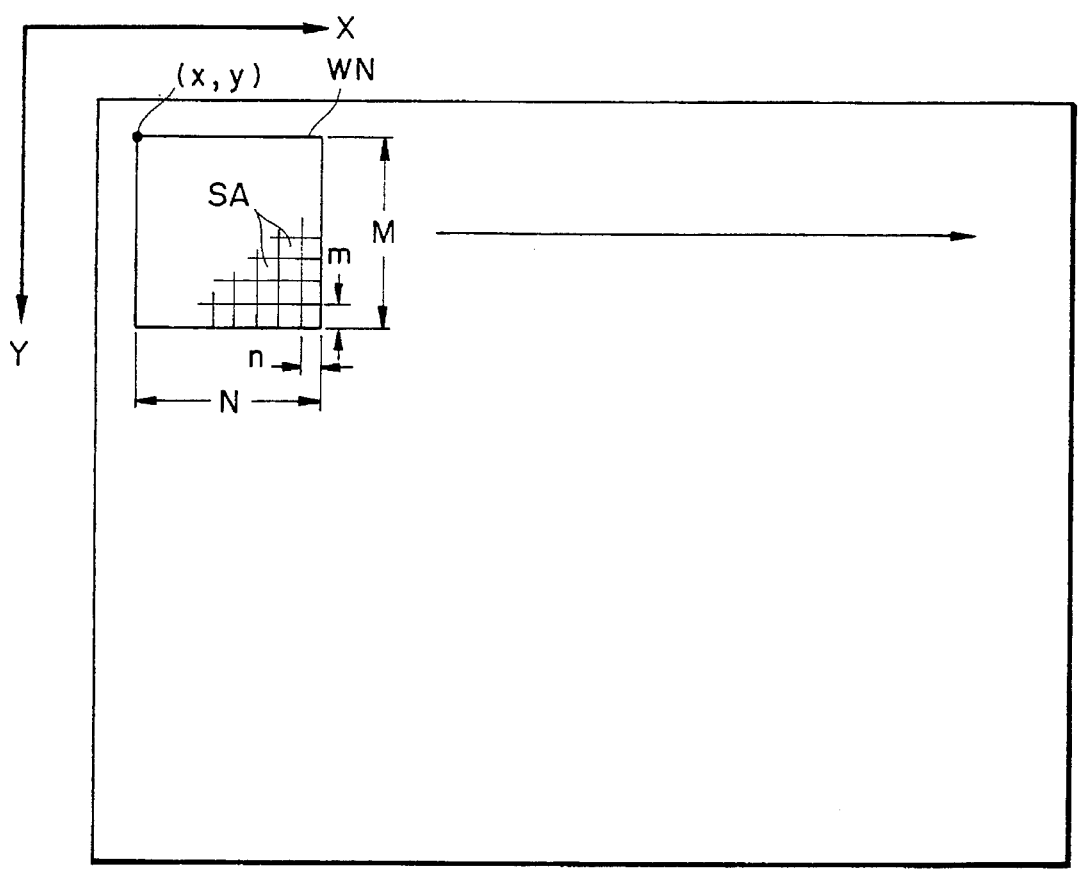
FIG. 3 illustrates a window set within a picture as well as a small area set within the window.
Figure 4A:
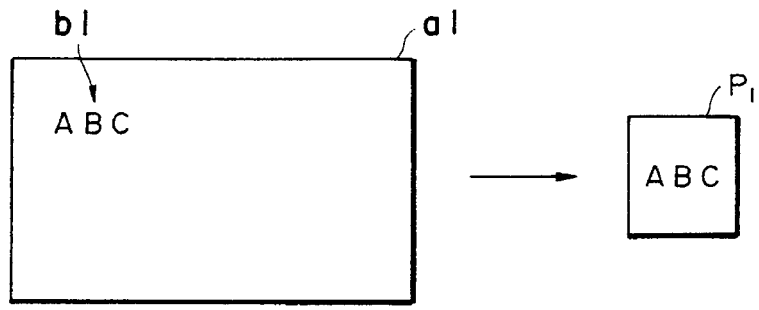
FIG. 4a to 4d show standard images extracted from securities.
Figure 4B:
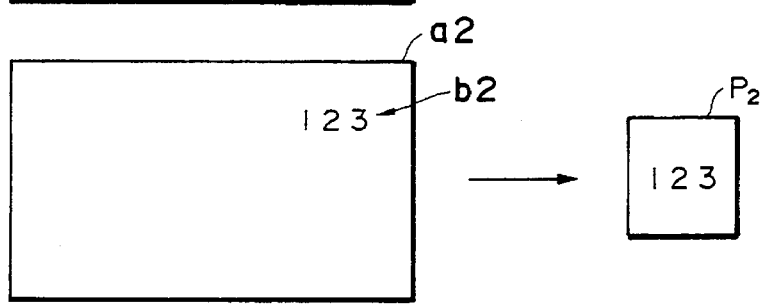
Figure 4C:
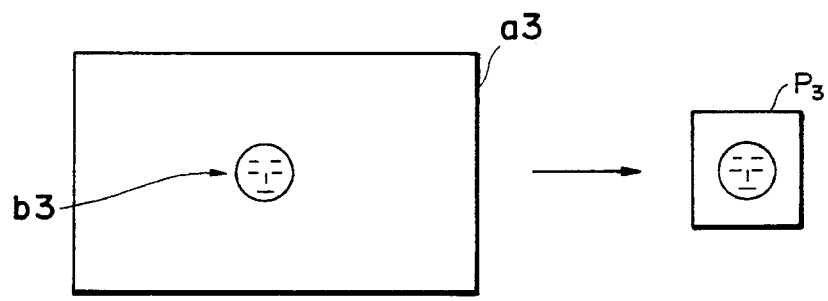
Figure 4D:
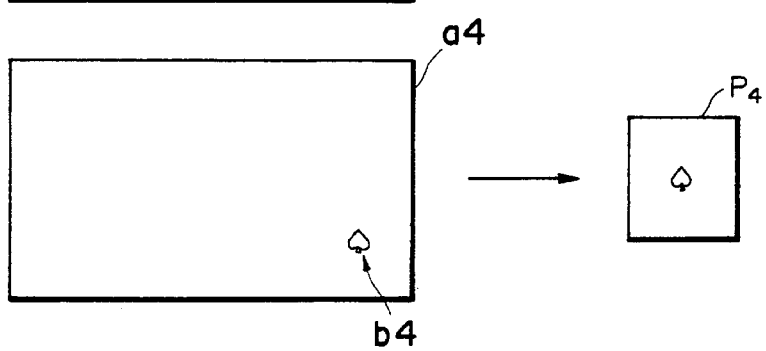

In order to clip a partial image from the input image, a square window WN is used, as shown in FIG. 3. Let the size of the window WN be N×M pixels (one pixel corresponds to the clock signal CK). The X and Y axes are taken respectively in the horizontal and vertical directions of the image. The position of the window WN is represented by the coordinates x, y of the point in the upper left-hand corner of the window.

Furthermore, in order to convert the dither image back into a gray-scale image, a plurality of square small areas SA that become one picture element of a restored gray-scale image are provided within the window WN. Let the size of each small area SA be n×m pixels (one pixel corresponds to the clock signal CK). This means that the window WN is partitioned into (N/n)×(M/m) small areas. It should be noted that a portion (spacing) that does not belong to any small area may be provided between mutually adjacent small areas.

By way of example, the window WN is set to 64 pixels (dots)×64 pixels (dots), and each small area SA is set to 4 pixels (dots)×4 pixels (dots). The window WN is partitioned into 16×16=256 small areas SA.

With reference again to FIG. 1, the image restoration circuit 14 generates reconstructed gray-scale image data by summing the dither image data (1 or 0) in each small area SA of the window WN. The size of one pixel of this restored gray-scale image data is equal to the size of the small area SA and possesses a lightness (density) resolution of n×m levels of gray (e.g., if n=m=4 holds, there will be 16 levels of gray).

The restored gray-scale image data is applied to each of the difference calculating circuits 15a~15k. The CPU 17 supplies the difference calculating circuits 15a~15k with a plurality of items of text data created beforehand with regard to the standard images. Each item of the text data is created beforehand with regard to the standard image by a technique exactly the same as that of processing for creating restored gray-level image data regarding the input image. For example, an image including the standard image is picked up by the camera 9, the video signal obtained is converted into digital image data by the A/D converter 11, dither image data is created by the dither-image generating circuit 13 with the digital image data serving as the input, a specific portion representing the standard image in the dither image data is cut out through a window, the window is subdivided into a plurality of small areas and the dither image data is summed for each and every small area, thereby creating text data. Of course, the text data may be created by another apparatus, applied to the CPU 17 through the I/O port 18 and then stored in a memory peripheral to the CPU 17.

For example, the standard images are extracted from securities (bills, stocks or bonds). As shown in FIGS. 4a to 4d, securities $a_1$~$a_4$ have characters, letters, marks, symbols or figures $b_1$~$b_4$ printed thereon and peculiar thereto. Images including these characters of figures are the standard images $P_1$~$P_4$. The standard images $P_1$~$P_4$ are extracted from the images of the securities $a_1$~$a_4$ picked-up and processed as described above to be text data. The text data are transferred sequentially to the difference calculating circuits 15a~15k and stored therein as explained later. The plurality items of text data fed to the difference calculating circuits 15a~15k are originated from standard images which are different from one another. A plurality of the standard images may be formed on the basis of one kind of securities. The number of pairs of the difference calculating circuits and peak holding circuits is the same as the number of the standard images.

Figure 5:
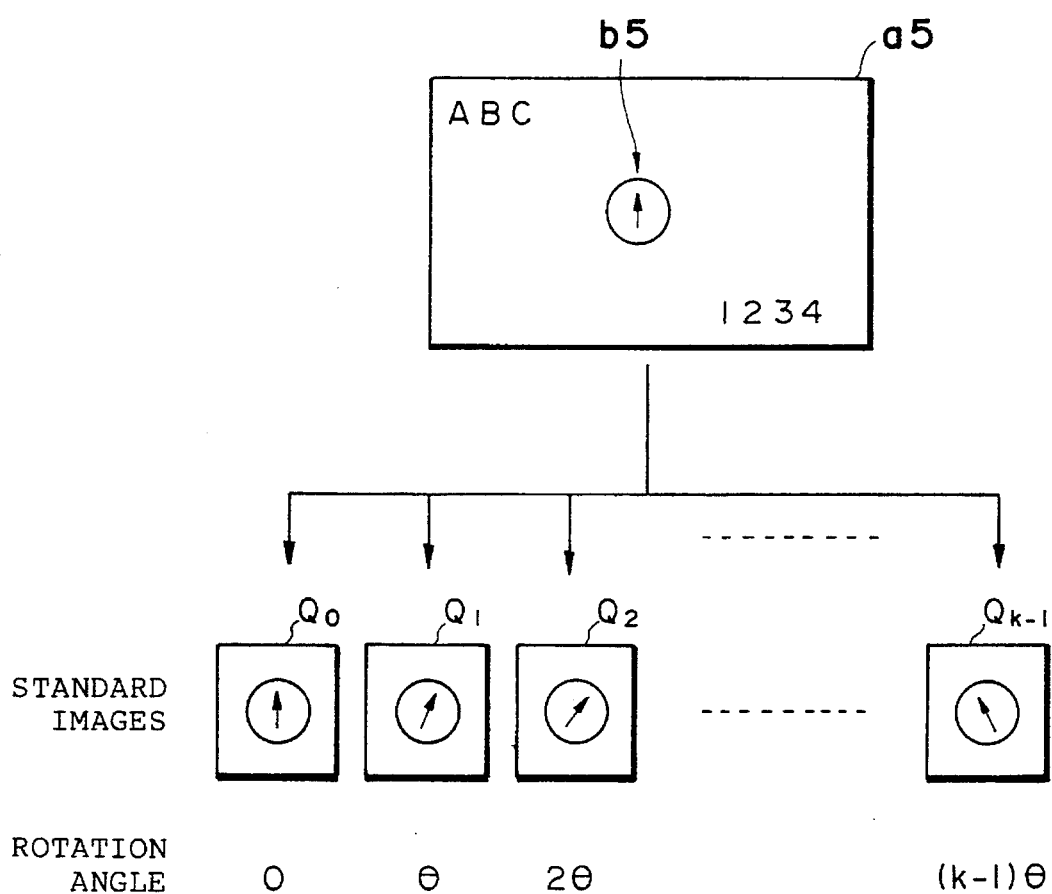
FIG. 5 shows standard images created by rotation of an image.

FIG. 5 shows another example of the way of creating a plurality of standard images. A standard figure $b_5$ is extracted from securities $a_5$. The standard figure $b_5$ is used as is to create the standard image $Q_0$. The other standard images $Q_1 \sim Q_{k-1}$ are formed by rotating the standard figure $b_5$ by $\theta$, $2\theta$, ..., $(k-1)\theta$ degrees, respectively ($\theta$ is an arbitrary angle). The rotation of the figure or image is achieved by rotating the camera 9 or securities $a_5$, or an image rotating processing which will be explained later. The plurality of items of text data produced from the standard images $Q_0 \sim Q_{k-1}$ are stored in the difference calculating circuits 15a~15k, respectively.

Each of the difference calculating circuits 15a~15k calculates the difference between the restored gray-level image data and the text data for each and every small area and sums the absolute values of these differences with regard to all of the small areas within the window. The smaller the sum value, the greater the similarity between the partial image cut from the input image by the window and the standard image. This is one type of pattern-matching processing.

As set forth above, the window WN is scanned across the entire area of the input image in the horizontal and vertical directions. Each of the peak holding circuits 16a~16k finds the window in which the sum of the absolute values of the aforementioned differences, which are fed from corresponding difference calculating circuit, takes on the minimum value. The minimum value of the sum and the coordinates of the position of the window in which the minimum value was obtained are applied to the CPU 17 from the respective peak holding circuits 16a~16k.

The CPU 17 executes predetermined processing based upon the minimum values and the coordinates of the window position provided by the peak holding circuits 16a~16k. For example, the CPU compares the applied minimum values with a predetermined threshold value and, if at least one of the minimum values is equal to or less than the threshold value, judges that the partial image cut from the input image by this window coincides with at least one of the standard images.

When it is judged that coincidence has been attained, the CPU uses the applied coordinates of the window to read the image data of the partial image for which coincidence has been judged out of the image memory 12, and applies this image data to an external device, e.g., a CRT display unit, through the I/O port 18 to present a display of the partial image. The partial image for which coincidence has been judged may by subjected to measurement processing (e.g., processing for tracing the contour, for calculating the area or position of the center of gravity of a portion defined by the contour or for recognizing shape).

Alternatively, the CPU 17 outputs a coincidence signal through the I/O port 18 when it is judged that coincidence has been attained.

The image processor 10 has many applications. An application example is a copying machine having a function of inhibiting securities from being copied. The standard images shown in FIGS. 4a to 4d or FIG. 5 which represent unique characters or figures of the securities are registered as text data in the image processor 10 (in the difference calculating circuits 15a~15k) as mentioned above. The coincidence signal outputted from the CPU 17 is fed to a control unit of the copying machine, which in turn inhibits copying operation.

In the case where the standard images shown in FIGS. 4a to 4d are registered, a plurality kinds of securities can be inhibited from being copied. In the case where the standard images shown in FIG. 5 are registered, the copying operation of the securities is inhibited even if the securities are set on the machine in an oblique state.

Specific examples of the construction of the circuit blocks shown in FIG. 1 will now be described in succession.

Figure 6:
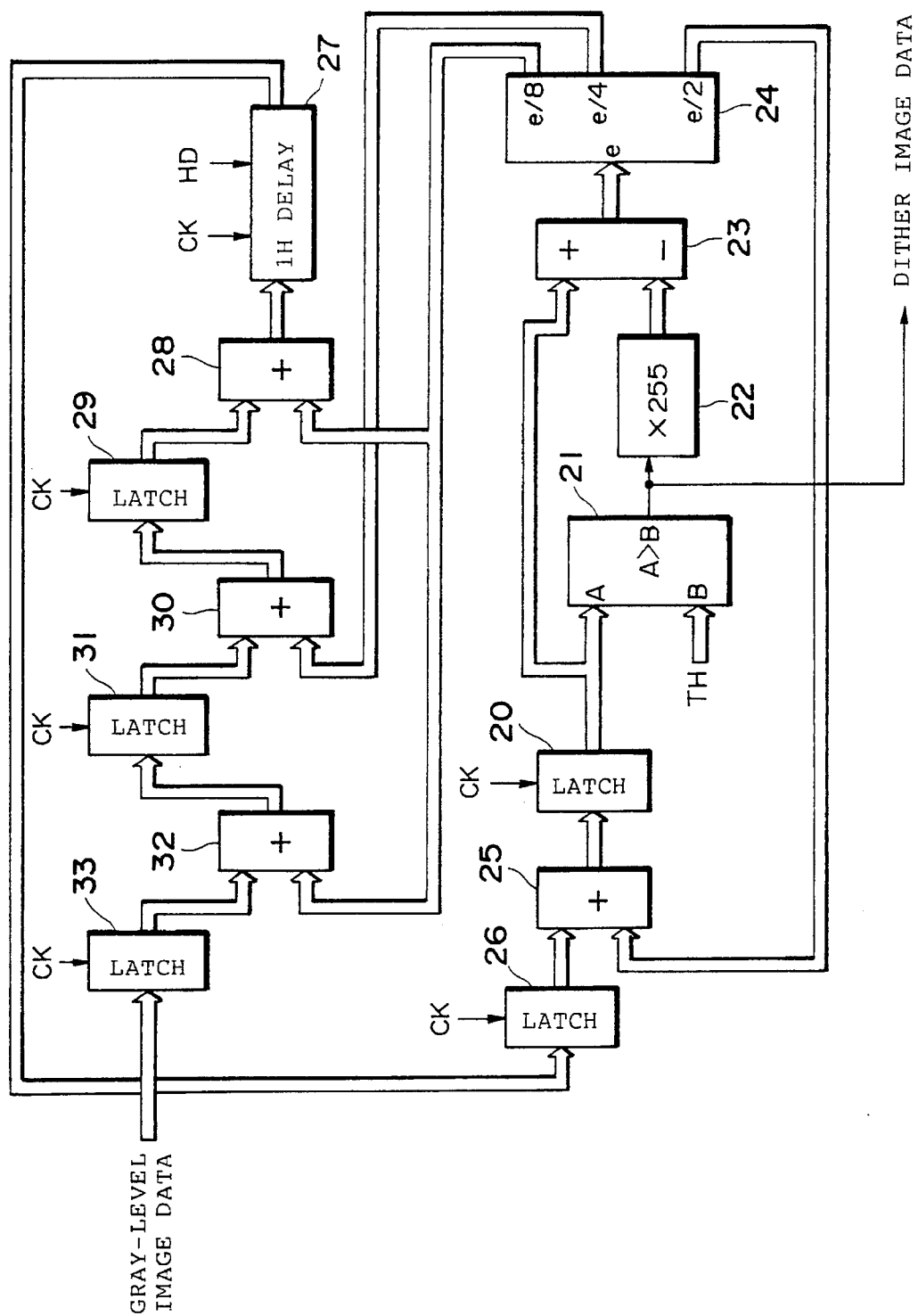
FIG. 6 is a block diagram illustrating a specific example of a dither-image generating circuit.

FIG. 6 illustrates a specific example of the construction of the dither-image generating circuit 13. Further, FIG. 7 and FIGS. 8a, 8b are for describing the principles of binarization by the error diffusion method.

Figure 7:
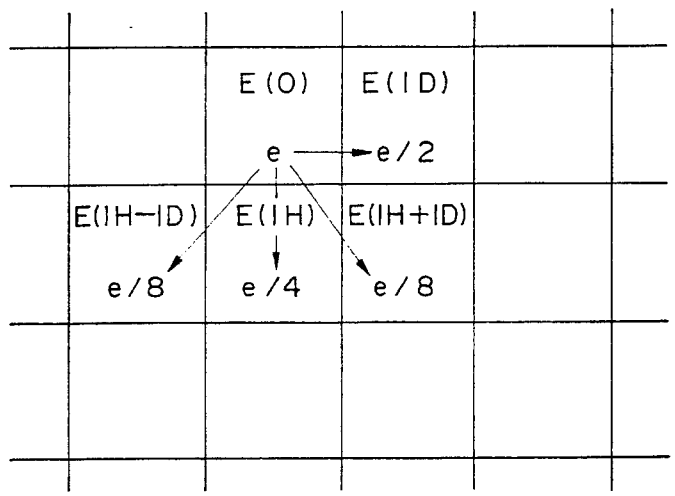
FIG. 7 and FIGS. 8a, 8b illustrate the principles of binarizing processing that employs the error diffusion method.
Figure 8A:
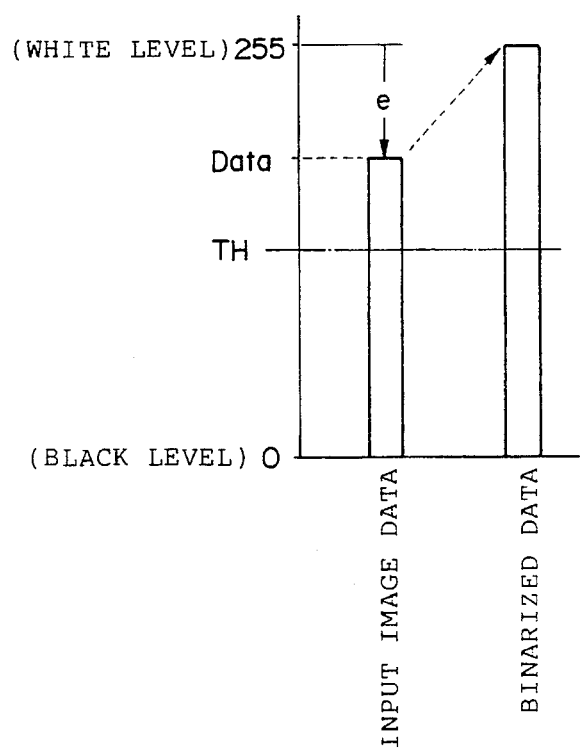
Figure 8B:
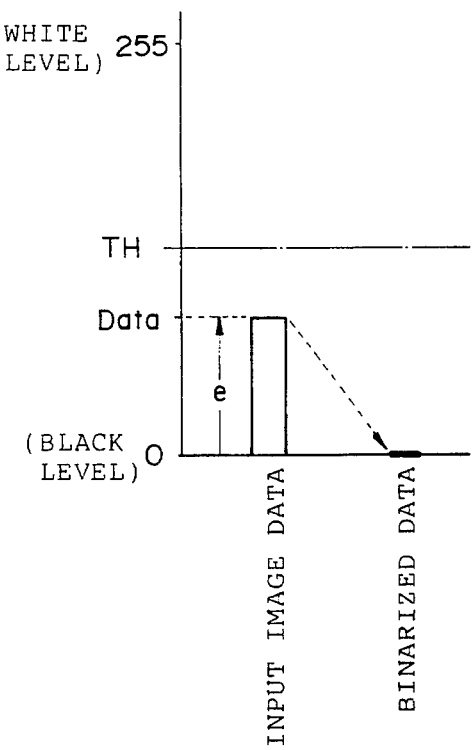

In FIG. 7, the description will focus on one pixel E(0) of an input image. The A/D conversion performed by the A/D converter 11 is carried out at a period of one clock for every item of image data (eight bits) of one pixel, and the image data is fed, one pixel at a time in the order of scanning, into the dither-image generating circuit 13 at the period of the clock signal. Let E(1 D) represent a pixel which is inputted 1 D later than the pixel E(0) of interest (where 1 D is one period of the clock signal CK). Similarly, let E(1 H) represent a pixel at a position delayed by 1 H relative to the pixel E(0) of interest (where 1 H is one horizontal scanning interval), let E(1 H–1 D) represent a pixel at a position delayed by (1 H–1 D) relative to E(0), and let E(1 H+1 D) represent a pixel at a position delayed by (1 H+1 D) relative to E(0).

In accordance with the error diffusion method, first an error e at the pixel E(0) of interest is calculated. In accordance with the dither method, image data "Data" of the pixel E(0) of interest is compared with a predetermined threshold value TH. The threshold value TH usually is set midway between the white level (Data=255) and the black level (Data=0). If "Data" exceeds the threshold value TH, then the pixel E(0) of interest is binarized (binary data 1) by being forcibly set to the white level, as shown in FIG. 8a, and the error e produced in this binarization is calculated in accordance with the following equation:

$$e = \text{"Data"} - 255 \qquad \text{Eq. (1)}$$

If "Data" is equal to or less than the threshold value TH, then the pixel E(0) of interest is binarized (binary data 0) by being forcibly set to the black level, as shown in FIG. 8b, and the error e produced in this binarization is calculated in accordance with the following equation:

$$e = \text{"Data"} - 0 \qquad \text{Eq. (2)}$$

The binary data obtained by this binarizing processing is dither image data. Accordingly, the dither image data is expressed by one bit per pixel.

The error e produced by binarizing processing is apportioned to the other pixels E(1 D), E(1 H–1 D), E(1 H) and E(1 H+1 D) at a rate of e/2, e/8, e/4 and e/8. This is the error diffusion method. Thus, even though the image data of the pixel of interest is quantized, the error attendant upon this quantization is apportioned to the pixels adjacent to the pixel of interest. As a result, the average lightness (density) in the local area centered upon the pixel of interest is substantially preserved.

In FIG. 6, latch circuits 20, 26, 29, 31 and 33, each of which is composed of eight flip-flops, temporarily store eight-bit image data and act to apply a delay of 1 D. The latch circuits 20, 26, 29, 31 and 33 are provided with the clock signal CK. A 1 H delay circuit 27, which delays the image data by an interval of 1 H, is provided with the clock signal CK and the horizontal synchronizing signal HD.

A situation will be considered in which the image data of the pixel E(0) of interest has been stored in the latch circuit 20. The image data "Data" of the pixel E(0) of interest is applied to one input terminal A of a comparator circuit 21. Data representing the threshold value TH is applied to the other input terminal B of the comparator circuit 21. The comparator circuit 21 outputs the binary data 1 if the input image data "Data" exceeds the threshold value TH (i.e., if A>B holds) and the binary data 0 in all other cases. This binary data is outputted as dither image data and also enters a multiplier circuit 22.

The multiplier circuit 22 multiplies the input binary data by 255. Accordingly, eight-bit data representing 255 is outputted by the multiplier circuit 22 if the input binary data is 1 and eight-bit data representing 0 is outputted if the input binary data is 0. The outputted data is applied to the negative input terminal of a subtractor circuit 23.

The image data "Data" of the pixel of interest held in the latch circuit 20 enters the positive input terminal of the subtractor circuit 23. Accordingly, the subtractor circuit 23 performs the operation represented by Equation (1) or Equation (2) and calculates the error e. The data representing the error e obtained is applied to a divider circuit 24.

The divider circuit 24 divides the error e by 2, 4 and 8 to calculated e/2, e/4 and e/8. Data representing the results of division e/2 is applied to an adder circuit 25, data representing e/4 is applied to an adder circuit 30, and data representing e/8 is applied to adder circuits 28, 32.

The image data of pixel E(1 D) is held in the latch circuit 26. This image data is fed into the adder circuit 25. Accordingly, the data representing e/2 is added to the image data of pixel E(1 D) in the adder circuit 25.

The image data of the pixels E(1 H−1 D), E(1 H), E(1 H+1 D) is temporarily stored in the latch circuits 29, 31, 33, respectively. The image data enters the adder circuits 28, 30, 32, respectively. Accordingly, the data representing e/8, e/4 and e/8 is added to the image data of the pixels E(1 H−1 D), E(1 H), E(1 H+1 D) in the adder circuits 28, 30, 32, respectively.

The various arithmetic operations described above are performed during one period of the clock signal CK, and the results of addition in the adder circuits 25, 28, 30, 32 are accepted by and temporarily stored in the succeeding circuits, namely the latch circuit 20, 1 H delay circuit 27 and latch circuits 29, 31, respectively, at the timing of the next clock signal CK. The image data of the pixel E(1 H+2 D) is accepted by the latch 33.

The foregoing operation is executed every period of the clock signal CK. That is, binarization of the image data and diffusion of the error, which is produced attendant upon binarization, to the adjacent pixels, namely dither processing, are executed pixel by pixel.

Figure 9:
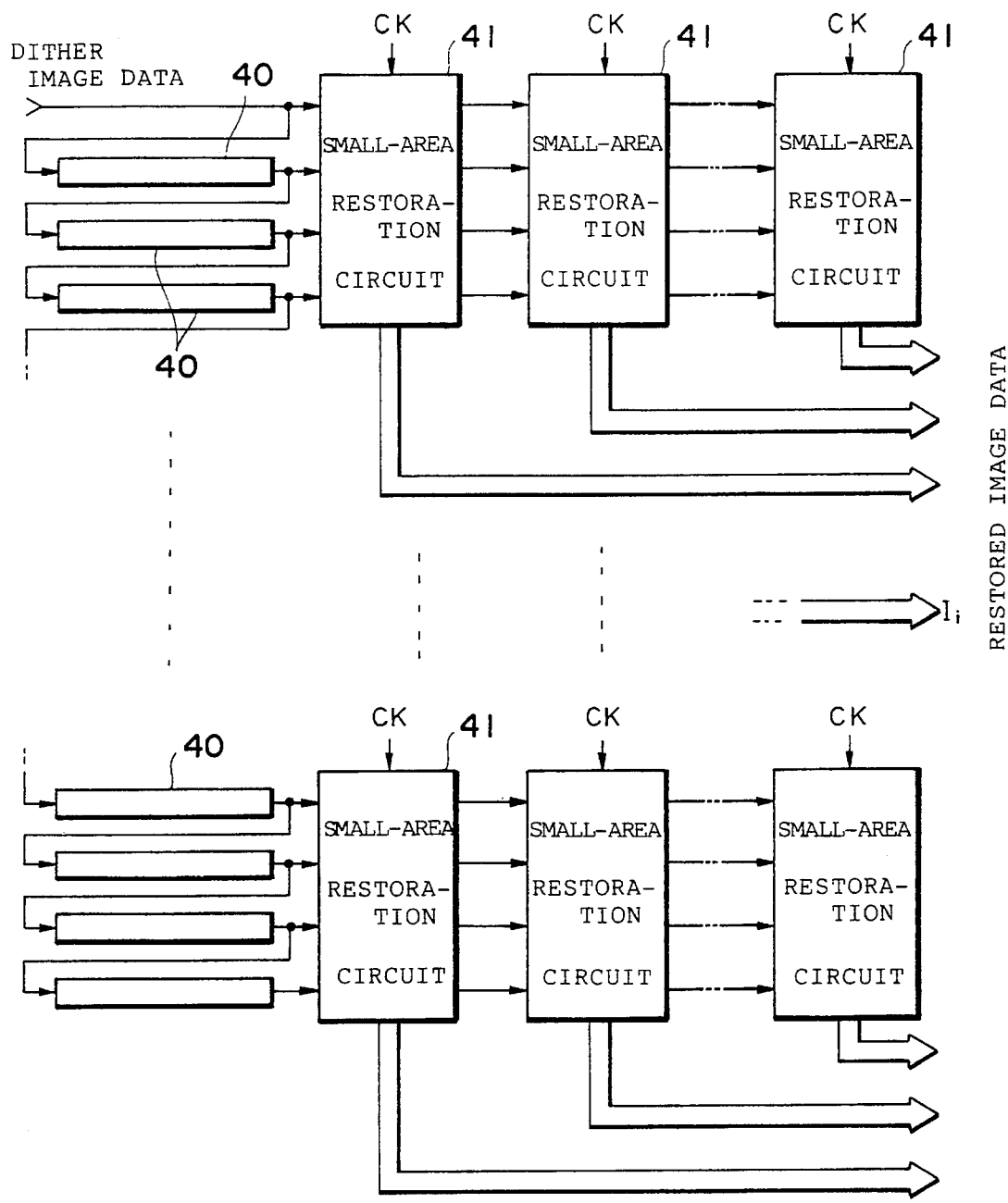
FIG. 9 is a block diagram illustrating a specific example of an image restoration circuit.
Figure 10:
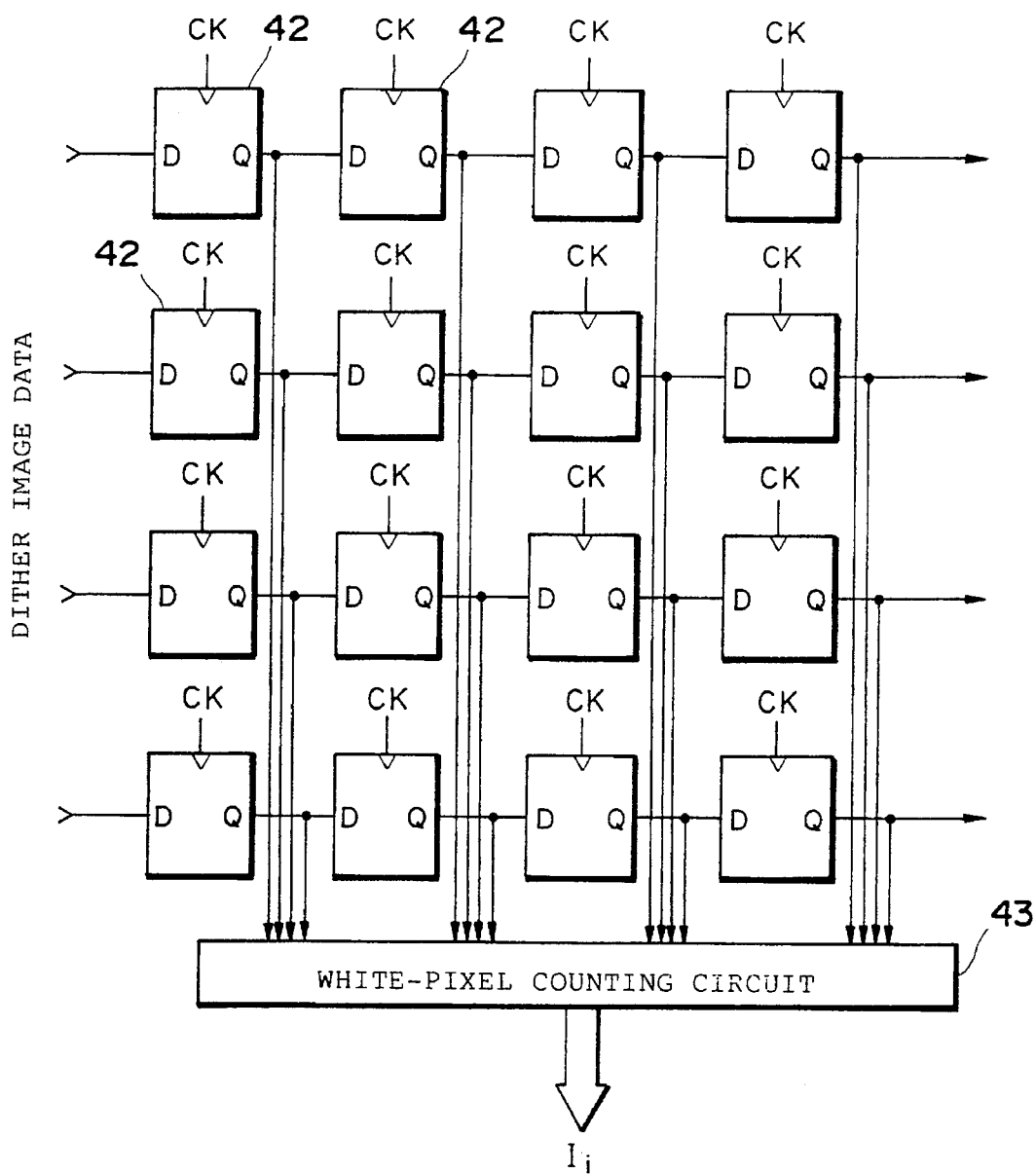
FIG. 10 is a block diagram illustrating a specific example of a small-area restoration circuit.

FIG. 9 illustrates the overall configuration of the image restoration circuit 14, and FIG. 10 illustrates a specific example of the construction of a small-area restoration circuit 41 shown in FIG. 9.

As mentioned above, the window WN is set in the input image and the window WN is scanned in the horizontal and vertical directions. The window WN is subdivided into the plurality of small areas SA.

The size (n×m) of each small area SA is decided by the number of flip-flops 42 contained in one small-area restoration circuit 41. In this embodiment, the size of each small area SA is 4×4 pixels, as shown in FIG. 10. The size (number of bits N) of the window WN in the horizontal direction is decided by the size (number of bits n) of the small-area restoration circuit 41 in the horizontal direction and the number of stages (N/n=16 stages in this embodiment) of the small-area restoration circuits 41 in the horizontal direction. The size (number of bits M) of the window WN in the vertical direction is decided by the size (number of bits m) of the small-area restoration circuit 41 in the vertical direction and the number of stages (M/m=16 stages in this embodiment) of the small-area restoration circuits 41 in the vertical direction.

In FIG. 9, the image restoration circuit 14 is provided with (N/n)×(M/m) small-area restoration circuits 41. The small-area restoration circuits 41 arrayed in the horizontal direction are connected in cascade. Further, (M−1)-number of one-bit line memories (one-bit shift registers) 40 are provided, and the line memories 40 also are connected in cascade. Further, the output of each line memory 40 enters the first column of corresponding small-area restoration circuits 41 arrayed in the vertical direction. That is, the output dither image data of the dither-image generating circuit 13 and the output data of the line memories 40 of the first through third stages are applied to the small-area restoration circuit 41 in the first column and first row. Similarly, the output data from four line memories 40 at a time is applied to those small-area restoration circuits of the first column that correspond thereto.

With reference to FIG. 10, each small-area restoration circuit 41 includes n×m flip-flops 42 arrayed in m row and n columns. The flip-flops 42 in the same row (lined up in the horizontal direction) are connected in cascade. Inputted to the flip-flop 42 in each row of the leading column is the output data of a line memory 40 (the output data of the dither-image generating circuit 13 is inputted to the flip-flop 42 in the first row and first column of the small-area restoration circuit 41 in the first row and first column) or the output data of the small-area restoration circuit 41 of the immediately preceding stage. The output data from the flip-flop 42 in each row of the last column is applied to a flip-flop 42 in the leading column of the succeeding small-area restoration circuit 41 (this is unnecessary if there is no small-area restoration circuit connected to the succeeding stage).

The output data (one-bit data) of each flip-flop 42 is applied to a white-pixel counting circuit 43. The latter counts the number of pixels possessing the white level (binary data 1) contained in the small area SA. Since the small area SA is composed of 4×4 pixels in this embodiment, the maximum value of the count is 16 and the output data of the counting circuit 43 is capable of being expressed by a minimum of five bits (expression by eight bits is of course permissible). Output data $I_i$ from the counting circuit 43 becomes the output data of the small-area restoration circuit 41.

The output data $I_i$ of the small-area restoration circuit 41 is the result of expressing the average lightness of the small area SA in the form of 16 levels. This is restored gray-level image data. When the small area SA is considered to be one picture element, this restored gray-level image data may be said to express the lightness in this element.

If the size of each small area SA is enclarged, the resolution (number of levels) of lightness will increase but the spatial (two-dimensional) resolution of the subject will decrease. Accordingly, the size of each small area SA should be decided upon taking into account the lightness resolution and spatial resolution required.

By contrast, the window WN would be set in conformity with the size of the subject to undergo image processing. For example, if the purpose of processing is to judge whether a partial image coincides with the standard image or to recognize the position of a circle contained by a subject, the window WN is set to a size that contains the partial image or the entirety of the circle.

The clock signal CK is applied to the line memories 40 and to the flip-flops 42 of the small-area restoration circuits 41 in the above-described image restoration circuit 14. The data that has accumulated in these is shifted sequentially every period of the clock signal CK. As a result, the window WN is scanned in the horizontal and vertical directions. At each position of the window WN, the restored gray-level image data is obtained with regard to all of the small areas SA contained in the window WN.

Figure 11:
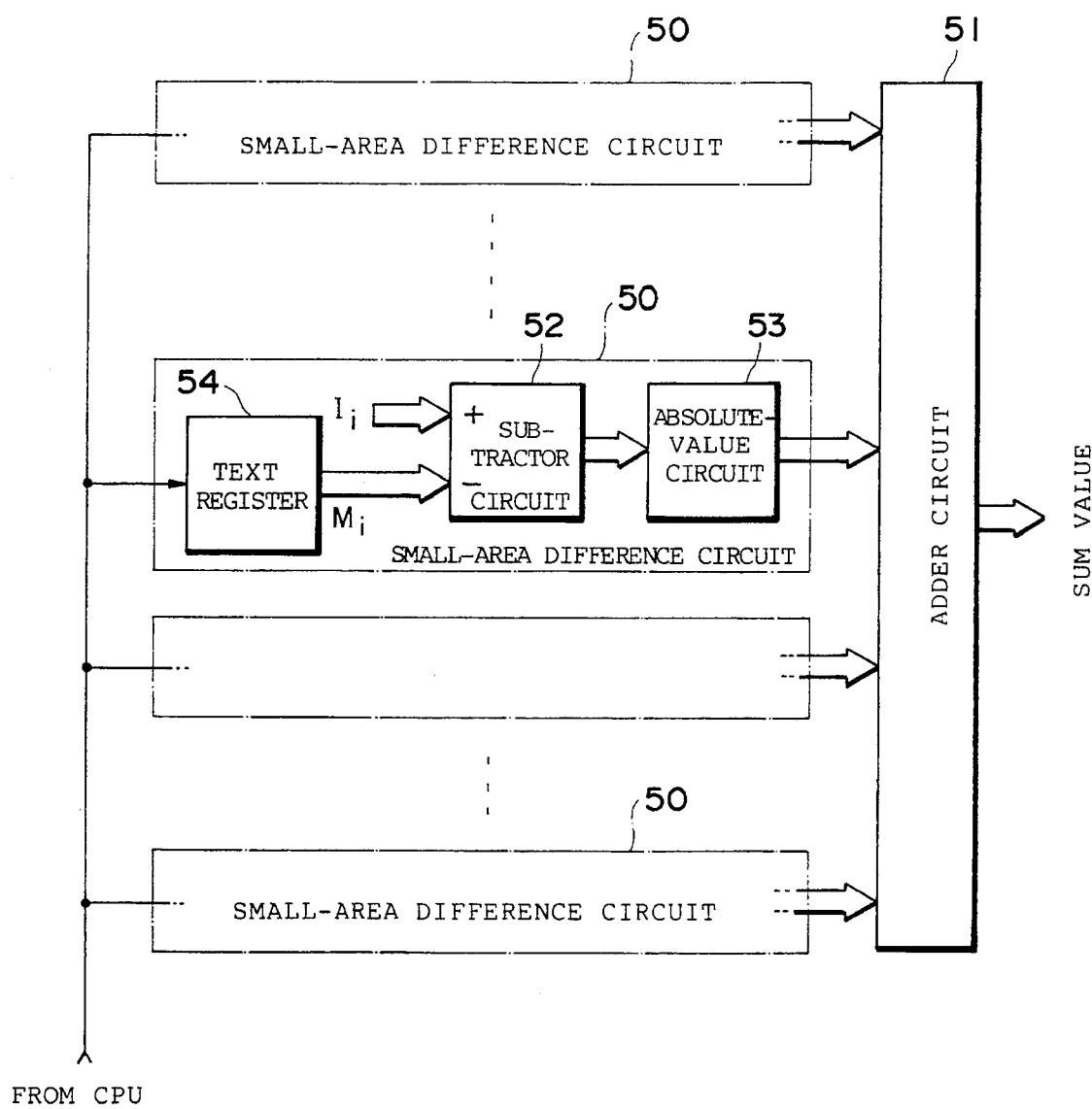
FIG. 11 is a block diagram illustrating a specific example of a difference calculating circuit.

FIG. 11 illustrates a specific exmaple of the construction of each of the difference calculating circuits 15*a*~15*k*.

The difference calculating circuit includes small-area difference circuits 50 the number of which is the same as that of the small-area restoration circuits 41. Each small-area difference circuit 50 is constituted by a subtractor circuit 52, an absolute-value circuit 53 and a text register 54. The output image data $I_i$ [i=1~(N/n)×(M/m)] of each small-area restoration circuit 41 is applied to the positive input terminal of the subtractor circuit 52 of the corresponding small-area difference circuit 50.

Meanwhile, as set forth above, text data $M_i$, which corresponds to the aforementioned restored gray-level image data $I_i$, and which is created in advance with regard to the standard image, is stored in the text register 54 of each small-area difference circuit 50 upon being provided by the CPU 17. The text data $M_i$ of each text register is applied to the negative input terminal of the subtractor circuit 52.

The text data $M_i$ is gray-level image data of a small area obtained by performing processing in accordance with a technique exactly the same as that used for the image data $I_i$ with regard to the standard image. In the illustrated example, the image data $M_i$ is applied serially to each text register 54 from the CPU 17. However, it is of course permissible to apply this data as parallel data through a data bus.

In the subtractor circuit 52, the text data $M_i$ is subtracted from the restored gray-level image data $I_i$, and the absolute value of the resulting difference is obtained in the absolute value circuit 53. The data representing the absolute value of the difference enters the adder circuit 51.

The adder circuit 51 sums the absolute-value data outputted by all of the small-area difference circuits 50. The value of the sum is applied to the peak holding circuit 16, which is the next stage. The value of the sum outputted by the adder circuit 51 represents the degree of similarity between the partial image within the window and the standard image. The smaller the value of the sum, the greater the similarity between the partial image and the standard image.

Figure 12:
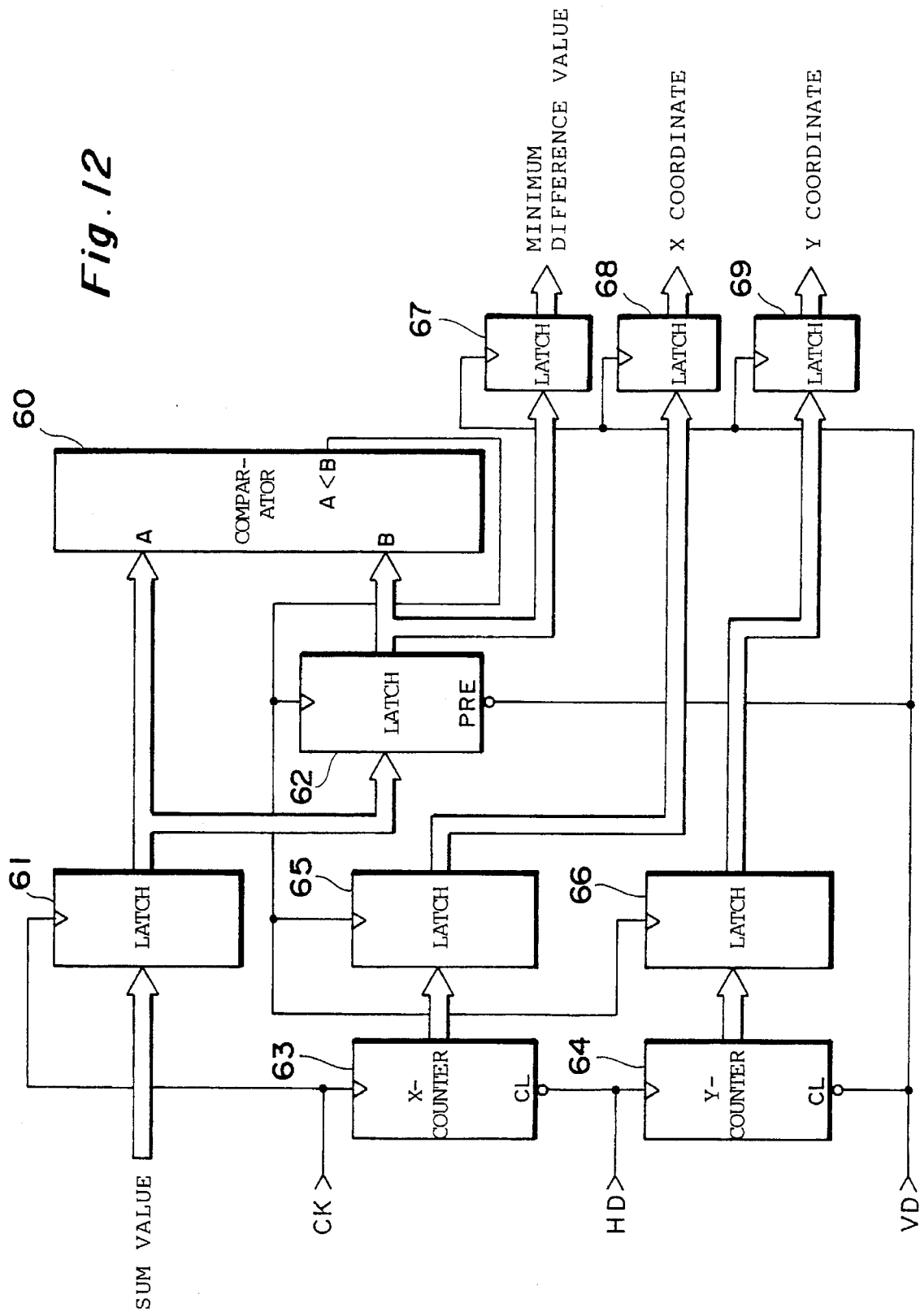
FIG. 12 is a block diagram illustrating a specific example of a peak holding circuit.

FIG. 12 illustrates a specific example of the construction of each of the peak holding circuits 16*a*~16*k*. The peak holding circuit detects the minimum value of the sum (the minimum difference value) provided by the corresponding difference calculating circuit and detects the coordinates representing the position of the window WN in which the minimum difference value is produced.

The minimum value of the sum inputted every period of the clock signal CK is detected by latch circuits 61, 62 and a comparator circuit 60. The maximum value possible (all 1s, for example) is preset in the latch circuit 62 at the timing at which the vertical synchronizing signal VD is applied at the start of peak holding processing. The sum provided by the difference calculating circuit is temporarily stored in the latch circuit 61 every clock signal CK. The comparator circuit 60 compares the value of the sum being held in the latch circuit 61 and the value being held in the latch 62 (initially the maximum value, as mentioned above; from the first comparison operation onward, the value is the minimum value of the sum prevailing up to the current time). If the value of the sum being held in the latch 61 is smaller, the comparator circuit 60 generates an output signal. The output signal of the comparator is applied to the latch circuit 62 as a latch timing signal, and the value of the sum being held in the latch circuit 61 at this time is latched in the latch circuit 62 as the minimum value up to the current time. Thus, among the entered sum values, the minimum sum value up to the current time is held in the latch circuit 62.

Meanwhile, an X counter 63 is cleared by the horizontal synchronizing signal HD and then counts the clock signal CK input thereto from this point in time onward. Accordingly, the count in the X counter 63 represents the X coordinate of the window WN. A Y counter 64 is cleared by the vertical synchronizing signal VD and then counts the horizontal synchronizing signal HD input thereto from this point in time onward. Accordingly, the count in the Y counter 64 represents the Y coordinate of the window WN. The output signal from the comparator 60 is applied to latch circuits 65, 66 as latch timing signals. The latch circuits 65, 66 therefore latch the counts of the respective counters 63, 64 prevailing at this time. The X, Y coordinates of the window WN in which the value of the sum is judged to be the minimum at this point in time are held in the latch circuits 65, 66.

When the next vertical synchronizing signal VD enters, the maximum value is again preset in the latch circuit 62 and latch circuits 67, 68, 69 respectively latch the minimum value of the difference from latch circuit 62, the X coordinate of the latch circuit 65 and the Y cooridnate of the latch circuit 66. Since the scanning of one picture by the window WN is concluded at this time, the minimum difference value in one picture and the X, Y coordinates of the window WN in which the minimum difference value is produced are held in the latch circuits 67, 68, 69 and applied to the CPU 17.

In the case where the image processor 10 is used in the copying machine for inhibiting securities from being copied, data representing the X, Y coordinates of the window WN in which the minimum difference value is produced do not need to be fed to the CPU 17. Only the minimum difference value in one picture is fed to the CPU 17 from each of the peak holding circuits 16*a*~16*k*. The CPU 17 finds the minimum one among the minimum difference values fed from the peak holding circuits 16*a*~16*k*, and judges whether the found minimum one is equal to or less than the threshold value. The coincidence signal is outputted only when the minimum one is judged to be equal to or less than the threshold value.

Since a plurality pairs of difference calculating circuits and peak holding circuits are provided in the first embodiment mentioned above, and a plurality of items of text data which represent a plurality kinds of standard images are registered in the difference calculating circuits, pattern-matching processings using a plurality of different standard images are performed in parallel, resulting in high speed processing.

The text data can be created directly from the standard image data without the intermediary of dither-image creation processing and gray-level image restoration processing. More specifically, the standard image data (expressed by eight bits per pixel) is subdivided into a plurality of small areas. The image data is summed for each and every small area and the result of the summing operation is divided by 256, whereby the text data is obtained. The reason for dividing by 256 is that the image data is represented by eight bits.

First Variation of First Embodiment

In the first embodiment described above, the dither image data is obtained by binarizing the input image data. According to the first variation of the first embodiment, pseudo-gray-level image data (multivalued dither image data) is obtained by subjecting the input image data to a multivalued conversion (quantization to multivalues more than three values). Further, an improvement in restorability is attempted by performing smoothing processing when the pseudo-gray-level image data is restored.

Figure 13:
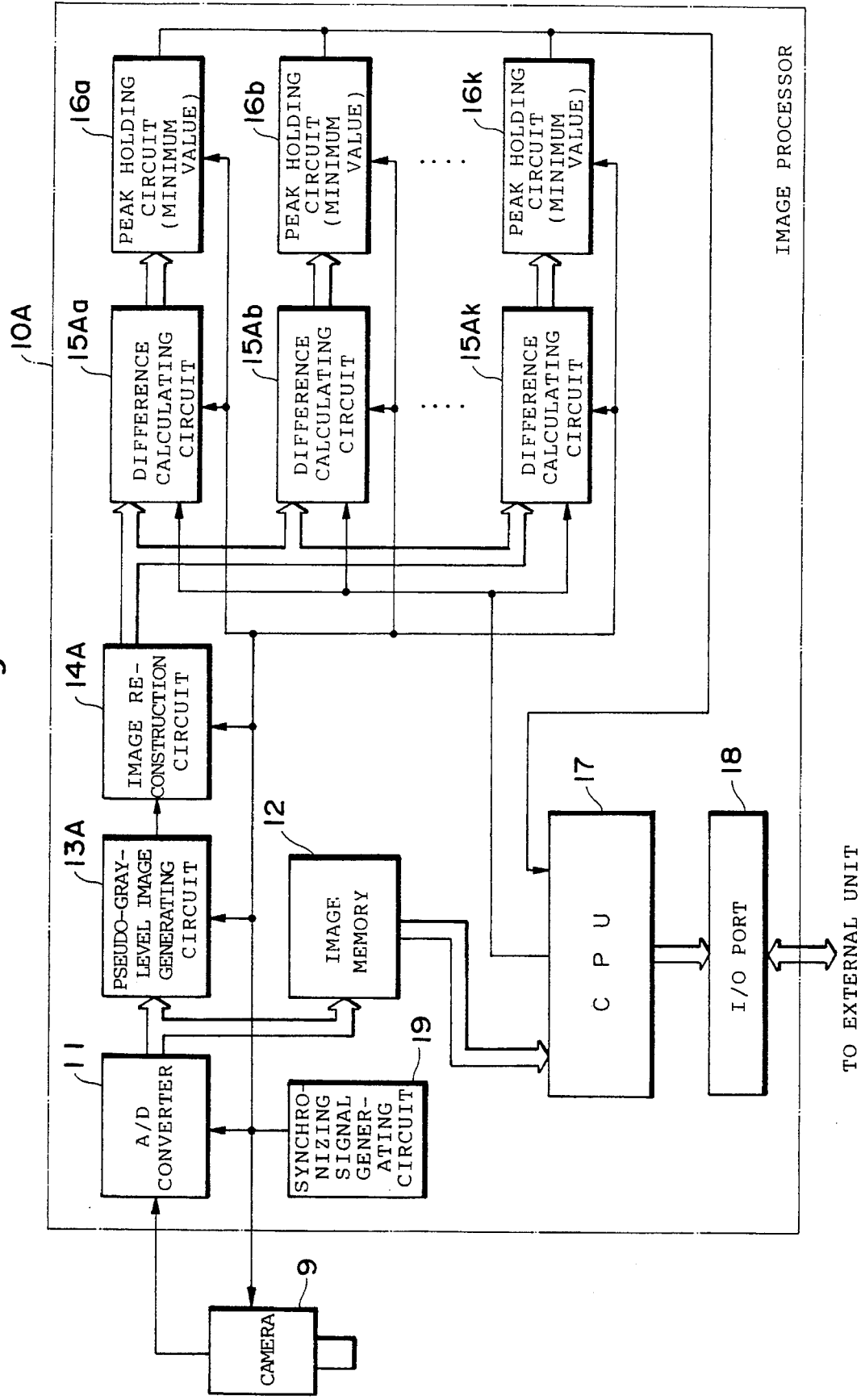
FIG. 13 is a block diagram illustrating the overall configuration of an image processor according to a first variation of the first embodiment.

FIG. 13 illustrates the overall configuration of an image processor according to the first variation of the first embodiment. This processor 10A differs from that of the first embodiment shown in FIG. 1 in that the dither-image generating circuit 13, image restoration circuit 14 and difference calculating circuits 15a~15k are replaced by a pseudo-gray-level image generating circuit 13A, an image restoration circuit 14A and difference calculating circuits 15Aa~15Ak. These points which distinguish this variation from the first embodiment will now be described.

Figure 14:
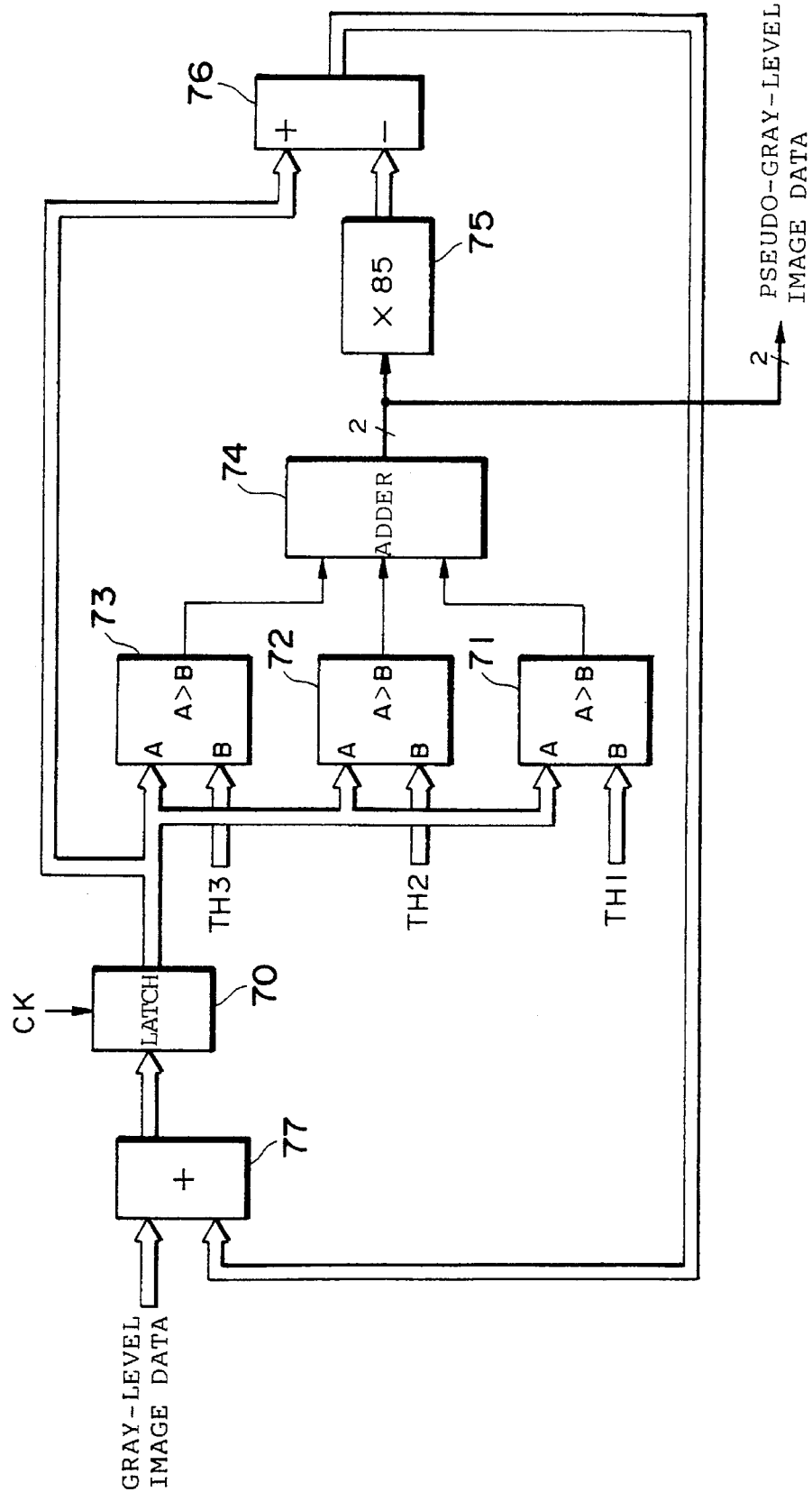
FIG. 14 is a block diagram illustrating a specific example of a pseudo-gray-scale image generating circuit.
Figure 15:
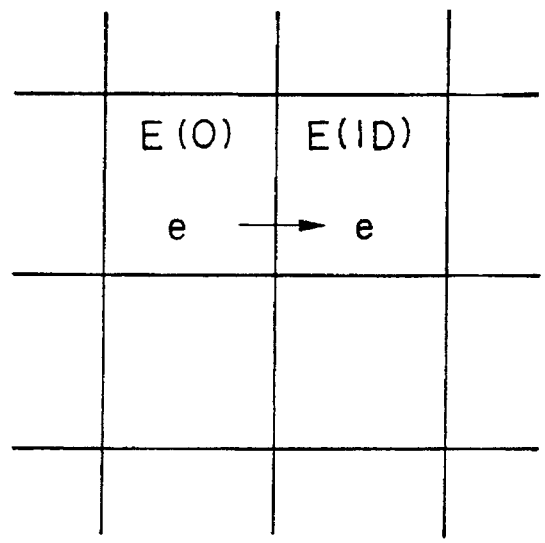
FIGS. 15 and 16 illustrate a method of multivalued processing using the error diffusion method.
Figure 16:
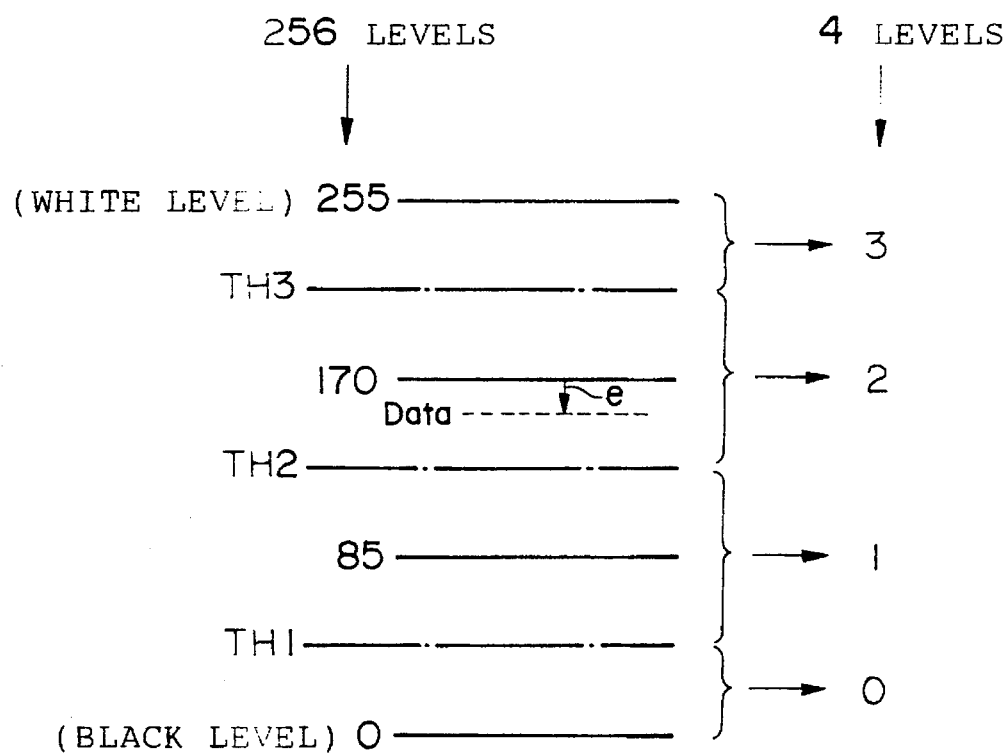
Figure 17:
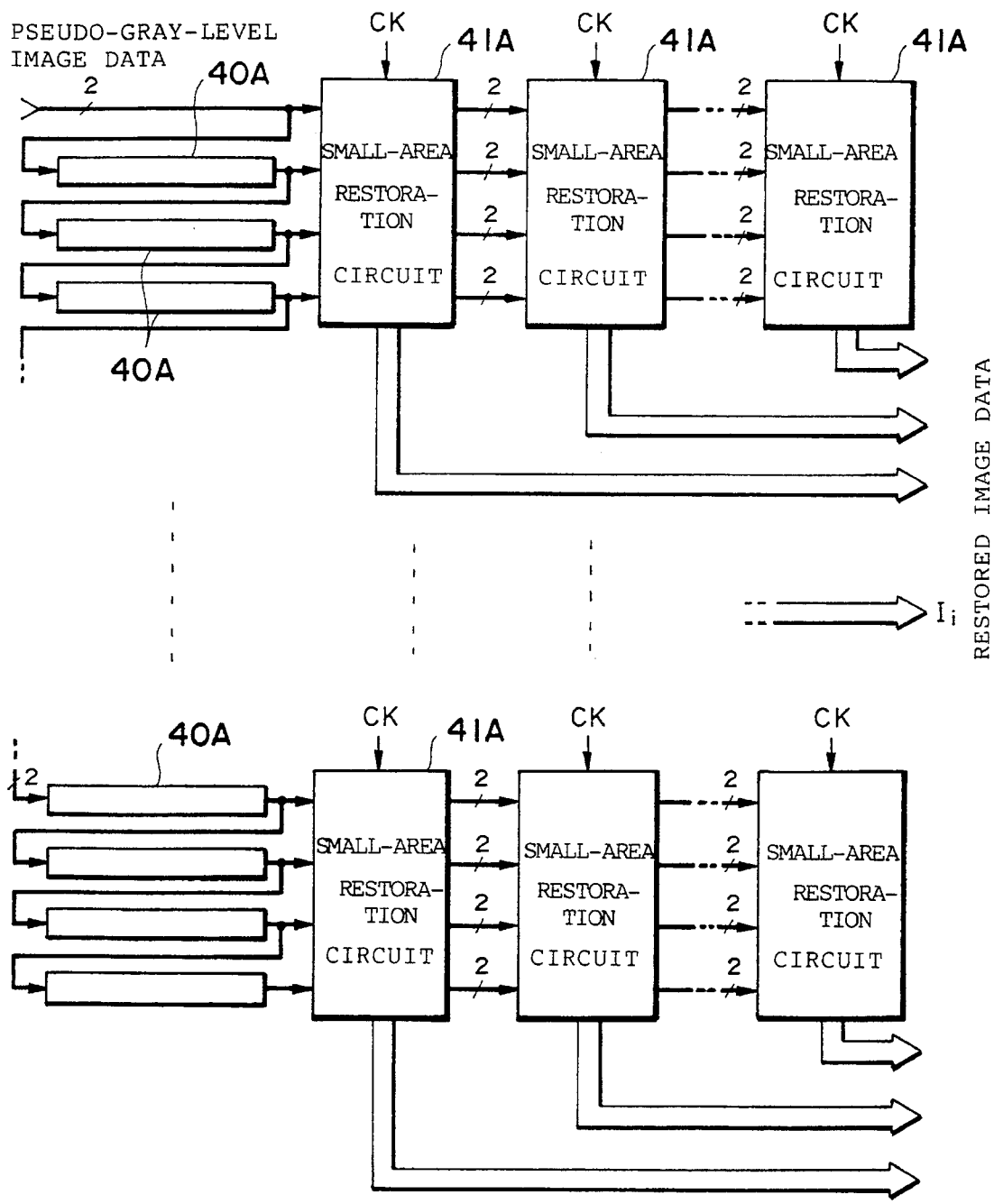
FIG. 17 is a block diagram illustrating a specific example of an image restoration circuit.

FIG. 14 shows a specific example of the construction of the pseudo-gray-level image generating circuit 13A. FIGS. 15 and 16 illustrate the principles quantization and error diffusion. Here the input image data is quantized to four values.

As mentioned above, input image data of 256 levels represented by eight bits is converted into pseudo-gray-level image data of four levels represented by two bits. To this end, as shown in FIG. 16, levels 0 (black level), 85, 170 and 255 (white level), of the 256 levels, corresponding to the levels 0, 1, 2 and 3 of the four levels are determined in advance. Threshold values TH1, TH2 and TH3 are set midway between the former levels.

The input image data "Data" is compared with the threshold values TH1, TH2 and TH3 and "Data" is quantized to pseudo-gray-level image data 00 (=0) if "Data" is less than the threshold value TH1; to 01 (=1) if "Data" is greater than the threshold value TH1 and less than the threshold value TH2; to 10 (=2) if "Data" is greater than the threshold value TH2 and less than the threshold value TH3; and to 11 (=3) if "Data" is greater than TH3. The error e produced in this quantization is represented by the following equation:

$$e = \text{``Data''} - (0, 85, 170 \text{ or } 255) \qquad \text{Eq. (3)}$$

In this embodiment, the quantization error e of the pixel E(0) of interest is propagated as is solely toward the succeeding pixel E(D1), as illustrated in FIG. 15.

In FIG. 14, it is assumed that the image data (eight bits) of the pixel E(0) of interest has been temporarily stored in the latch circuit 70. The image data "Data" is applied to the input terminal A of each of comparator circuits 71, 72 and 73. Data representing the threshold values TH1, TH2, TH3 is applied to the input terminal B of each of comparator circuits 71, 72 and 73. The comparator circuits 71, 72 and 73 each generate an output representing 1 if the input image data "Data" at the input terminal A is greater than the threshold-value data at the input terminal B (A>B) and generate an output representing 0 in all other cases. These comparator outputs are applied to an adder circuit 74.

The adder circuit 74 sums the comparator outputs applied thereto. The result of addition is 3 if all of the comparator circuits 71, 72, 73 generate the output 1; 2 if the two comparator circuits 71, 72 generate the output 1; 1 if only the comparator circuit 71 generates the output 1; and 0 if all of the comparator circuits 71, 72, 73 generate the output 0. The results of addition from the adder circuit 74 are outputted as pseudo-gray-level image data of two bits.

The results of addition outputted by the adder circuit 74 are applied to a multiplier circuit 75 to be multiplied by 85. The output of the multiplier circuit 75 takes on a value which is one of the above-mentioned four levels 0, 85, 170, 255 of the 256 levels.

The image data "Data" of the pixel E(0) of interest that has been latched in the latch circuit enters the positive input terminal of a subtractor 76, and the output of the multiplier circuit 75 enters the negative input terminal of the subtractor circuit 76. The subtractor circuit 76 performs the subtraction operation given by Equation (3) and outputs data representing the error e.

The data representing the error e is applied to an adder circuit 77, where this data is added to the image data of the next pixel E(D1). The result of addition performed by the adder circuit 77 is latched in the latch circuit 70 at the timing of the next clock signal CK.

Since the above-described operation is repeated at the period of the clock signal CK, the pseudo-gray-level image generating circuit 13A outputs pseudo-gray-level image data of two bits at the period of the clock signal CK.

FIG. 15 illustrates the overall configuration of the image restoration circuit 14A. In comparison with the image restoration circuit 14 shown in FIG. 9, it will be seen that this circuit differs in that the one-bit line memories 40 are replaced by two-bit line memories 40A. Further, as shown in FIG. 18, the construction of a small-area restoration circuit 41A also differs from that of the small-area restoration circuit 41 illustrated earlier.

Figure 18:
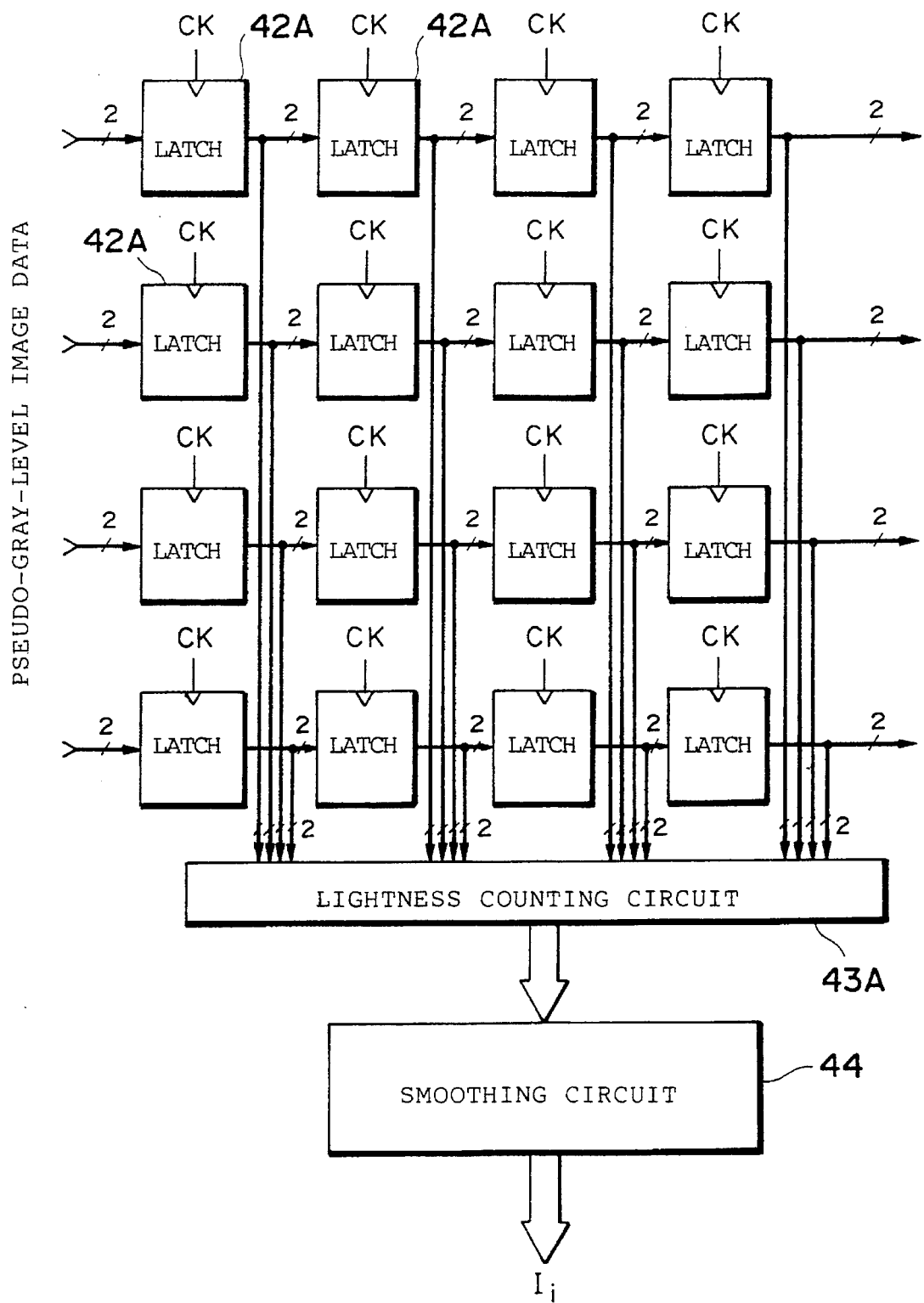
FIG. 18 is a block diagram illustrating a specific example of a small-area restoration circuit.

A specific example of the construction of the small-area restoration circuit 41A is illustrated in FIG. 18. A comparison with the small-area restoration circuit 41 shown in FIG. 10 shows that the small-area restoration circuit 41A differs in that the flip-flops 42 are replaced by two-bit latch circuits 42A. The white-pixel counting circuit 43 is replaced by a lightness counting circuit 43A. The circuit 43A is for adding two-bit signals from the 16 latch circuits 42A. Thus, the small-area restoration circuit 41A is capable of restoring pseudo-gray-level image data of four levels to image data of 48 levels, with the small area SA serving as one picture element.

In comparison with the image restoration processing according to the first embodiment, spatial resolution is the same if the size of the small are SA is the same. In the second embodiment, however, the input image data is converted into two-bit, pseudo-gray-level image data of four levels, and image restoration processing is executed using this pseudo-gray-level image data. This is advantageous in that the resolution of lightness (density) is improved.

The small-area restoration circuit 41A further includes a smoothing circuit 44. The smoothing circuit 44 sums the restored image data, which is outputted successively by the lightness counting circuit 43A, over three periods of the clock signal CK.

Figure 19:
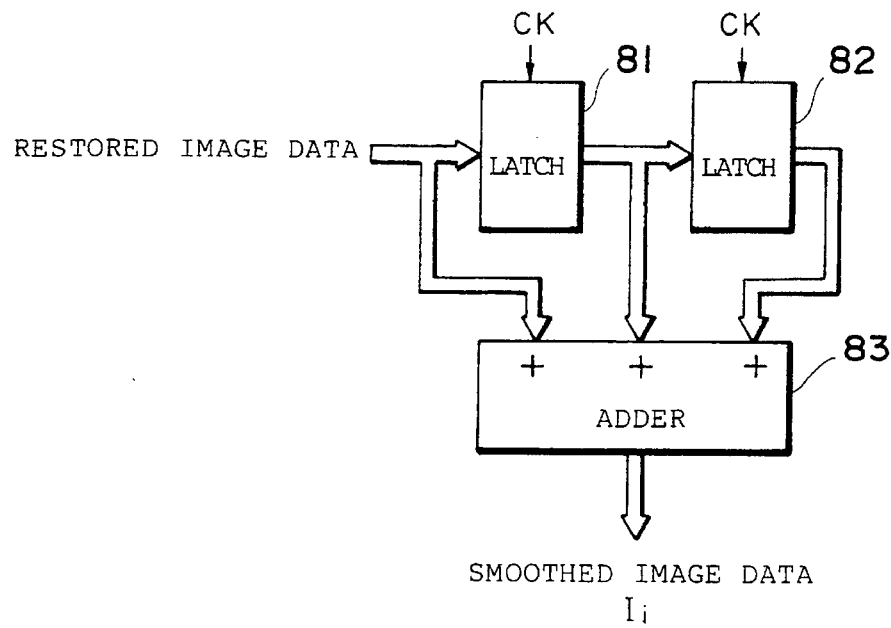
FIGS. 19 and 20 are block diagrams illustrating examples of a smoothing circuit.

An example of the smoothing circuit 44 is illustrated in FIG. 19. The restored image data outputted by the lightness counting circuit 43A is latched successively in latch circuits 81, 82 at the timing of the clock signal CK. The restored image data at a certain point in time outputted by the lightness counting circuit 43A and restored image data outputted from the latch circuits 81, 82 one and two clock periods earlier than this point in time are added in an adder circuit 83, and the sum is outputted as smoothed image data $I_i$ (for the sake of simplicity, the smoothed image data is represented by the character $I_i$, which is the same as that of the restored image data of the first embodiment).

Figure 20:
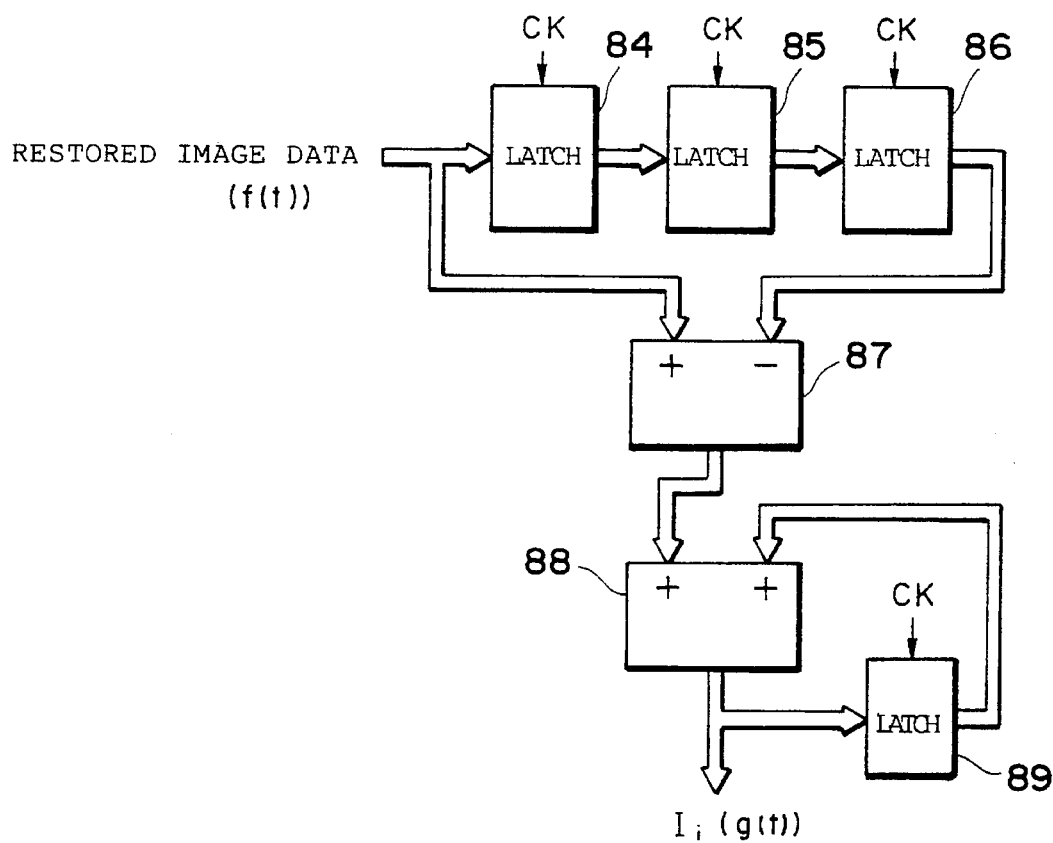

FIG. 20 illustrates another example of the smoothing circuit 44.

Let f(t) replace the restored image data at a certain time t, and let f(t−1), f(t−2) and f(t−3) replace the restored image data one, two and three clock periods earlier, respectively. Let g(t) represent the smoothed image data.

Since the smoothing circuit 44 adds the restored image data f(t), f(t−1) and f(t−2), the smoothed image data g(t) may be written as follows:

$$g(t)=f(t)+f(t-1)+f(t-2) \quad \text{Eq. (4)}$$

Writing (t−1) for t in Equation (4), we have $$g(t-1)=f(t-1)+f(t-2)+f(t-3) \quad \text{Eq. (5)}$$

The following equation is derived from Equations (4) and (5):

$$g(t)=g(t-1)+f(t)-f(t-3) \quad \text{Eq. (6)}$$

The circuit of FIG. 20 executes the arithmetic operation of Equation (6). Latch circuits 84, 85, 86 latch the items of restored image data f(t−1), f(t−2), f(t−3), respectively. The arithmetic operation f(t)−f(t−3) from the second term onward on the right side of Equation (6) is executed by a subtractor circuit 87. A latch circuit 89 latches the smoothed image data g(t−1) that prevails one clock period earlier. Accordingly, the arithmetic operation on the right side of Equation (6) is performed in an adder circuit 88, and the smoothed image data g(t) is obtained. The circuit of FIG. 20 is advantageous in that the scale of the circuit is simplified in actuality in comparison with the circuit of FIG. 19.

As described in connection with FIG. 15, the error e of the pixel E(0) of interest is propagated solely toward one succeeding pixel E(D1). However, since the error in the pixel E(D1) is further propagated toward the following pixel E(D2), in actuality the error of the pixel E(0) of interest has an influence upon image data even at fairly distant pixels. The greater the distance from the pixel of interest, the smaller the degree of this influence. In accordance with the above-described smoothing processing, image restoration that takes into account the influence of the error at the pixel of interest is performed. Restorability is improved as a result. More specifically, since the restored image data of a small area is smoothing spatially, resolution in terms of lightness is raised without causing a decline in spatial resolution. The precision of matching processings in the difference calculating circuits 15Aa~15Ak are improved. This is advantageous in a case where it is required to express minute differences in lightness, as in a low-contrast image.

Each of the difference calculating circuits 15Aa~15Ak is basically the same as the difference calculating circuit shown in FIG. 11. Whereas 16-level restored image data is dealt with in each of the difference calculating circuits 15a~15k, 48-level restored and smoothed image data is dealt with in each of the difference calculating circuits 15Aa~15Ak. This is the only difference. Of course a plurality of text data representing different standard images are registered in these difference calculating circuits 15Aa~15Ak.

Second Variation of First Embodiment

In the first embodiment and the first variation thereof, the difference method used as the pattern matching technique involves calculating, for each and every small area SA, the difference in lightness between the restored image in the window WN and the standard image by means of each of the difference calculating circuits 15a~15k or 15Aa~15Ak.

In the second variation of the first embodiment, the pattern-matching technique involves calculating a normalized cross-correlation value between the restored image in the window WN and the standard image.

Figure 21:
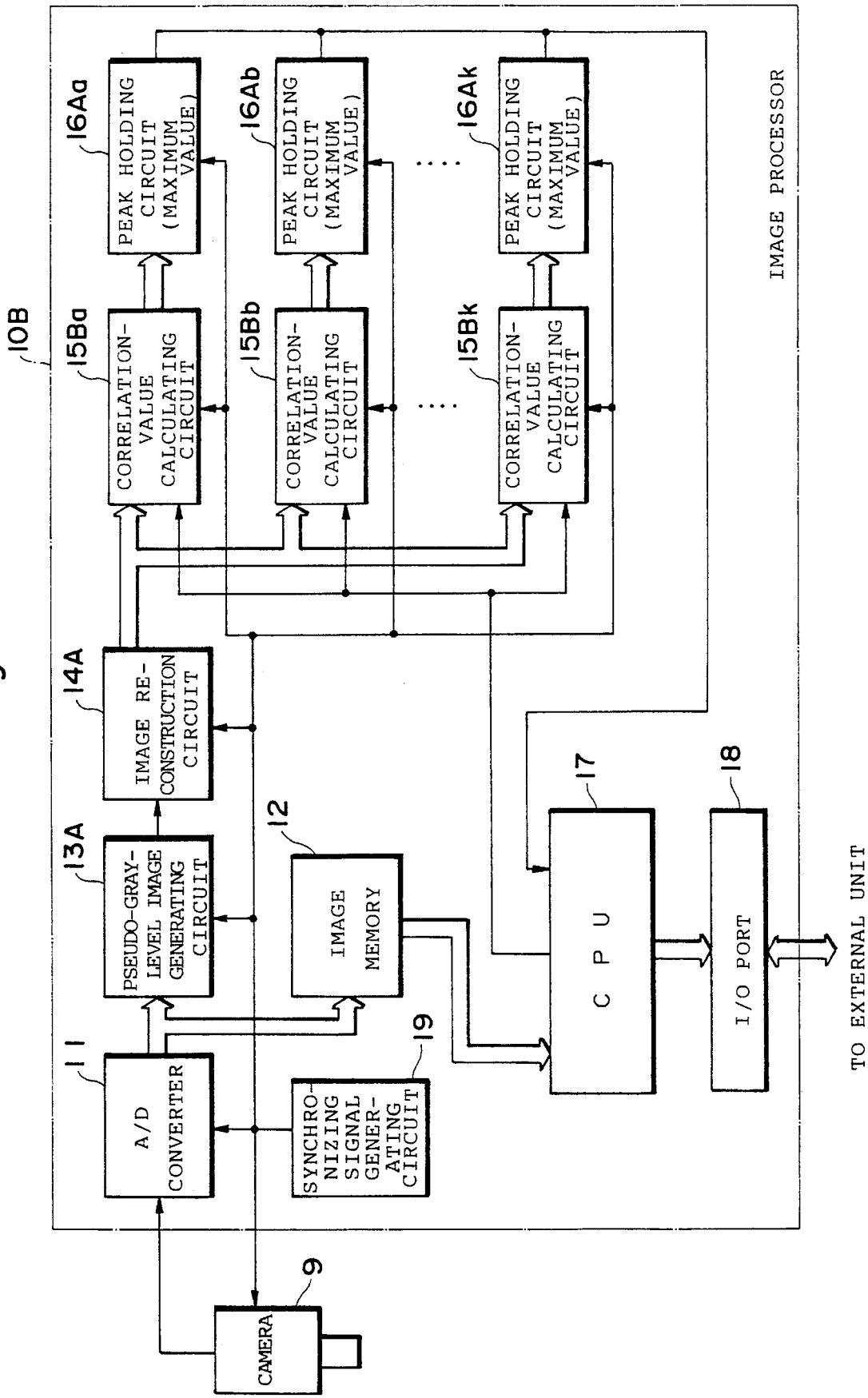
FIG. 21 is a block diagram illustrating the overall configuration of an image processor according to a second variation of the first embodiment.

FIG. 21 illustrates an example of the overall configuration of an image processor 10B according to the second variation of the first embodiment. Components identical with those according to the first variation shown in FIG. 13 are designated by like reference characters. This variation differs in that the difference calculating circuits 15Aa~15Ak and the peak holding circuits 16a~16k for each detecting a minimum value are replaced by correlation-value calculating circuits 15Ba~15Bk and peak holding circuits 16Aa~16Ak for each detecting a maximum value, respectively. The dither-image generating circuit 13 and the image restoration circuit 14 according to the first embodiment shown in FIG. 1 can be used instead of the pseudo-gray-level image generating circuit 13A and image restoration circuit 14A, respectively.

As described in the first embodiment and the first variation thereof, the image restoration circuit 14 or 14A outputs the restored image data $I_i$ [i=1~r; r=(N/n)×(M/m)] within the window WN, and this image data is applied to the correlation-value calculating circuits 15Ba~15Bk. The restored image data $I_i$ is represented with the small area SA serving as picture element. The number of small areas SA is 256 in terms of the example described above. That is, r=256. Meanwhile, the CPU 17 outputs the corresponding image data (text data) $M_i$ (i=1~r) regarding the standard image for each correlation-value calculating circuit, which is the matching criterion. Different image data is applied to each of the correlation-value calculating circuit 15Ba~15Bk. These items of image data $M_i$ are held in a temporary memory circuit, such as a text register, in each of the correlation-value calculating circuits 15Ba~15Bk. A normalized cross-correlation value R is calculated in each of the correlation-value calculating circuits 15Ba~15Bk in accordance with the following equation:

$$R^2=[r(\Sigma IM)-(\Sigma I)(\Sigma M)]^2/[r(\Sigma I^2)-(\Sigma I)^2]\cdot[r(\Sigma M^2)-(\Sigma M)^2] \quad \text{Eq. (7)}$$

where Σ represents addition with regard to i=1~r.

The correlation value R is calculated for the window WN at each position scanned, and the calculated correlation value R is applied to the corresponding peak holding circuit 16Aa, 16Ab, . . . , or 16Ak. The peak holding circuit detects the maximum value of the applied correlation value R and, when the scanning of the window regarding one picture ends, outputs this maximum value as well as the coordinates of the position of the window WN in which the maximum value was produced. The maximum value and the coordinates are applied to the CPU 17.

In a manner identical with that of the first embodiment and the first variation thereof, the CPU 17 compares the applied maximum correlation values from the peak holding circuits 16Aa~16Ak with the predetermined threshold value and construes that the standard image has been found if at least one of the maximum correlation value exceeds the threshold value. The partial image found (the image within the window that provides the maximum correlation value) is displayed on a display unit or subjected to various types of measurement processing. Alternatively, a coincidence signal is outputted from the CPU 17.

Figure 22:
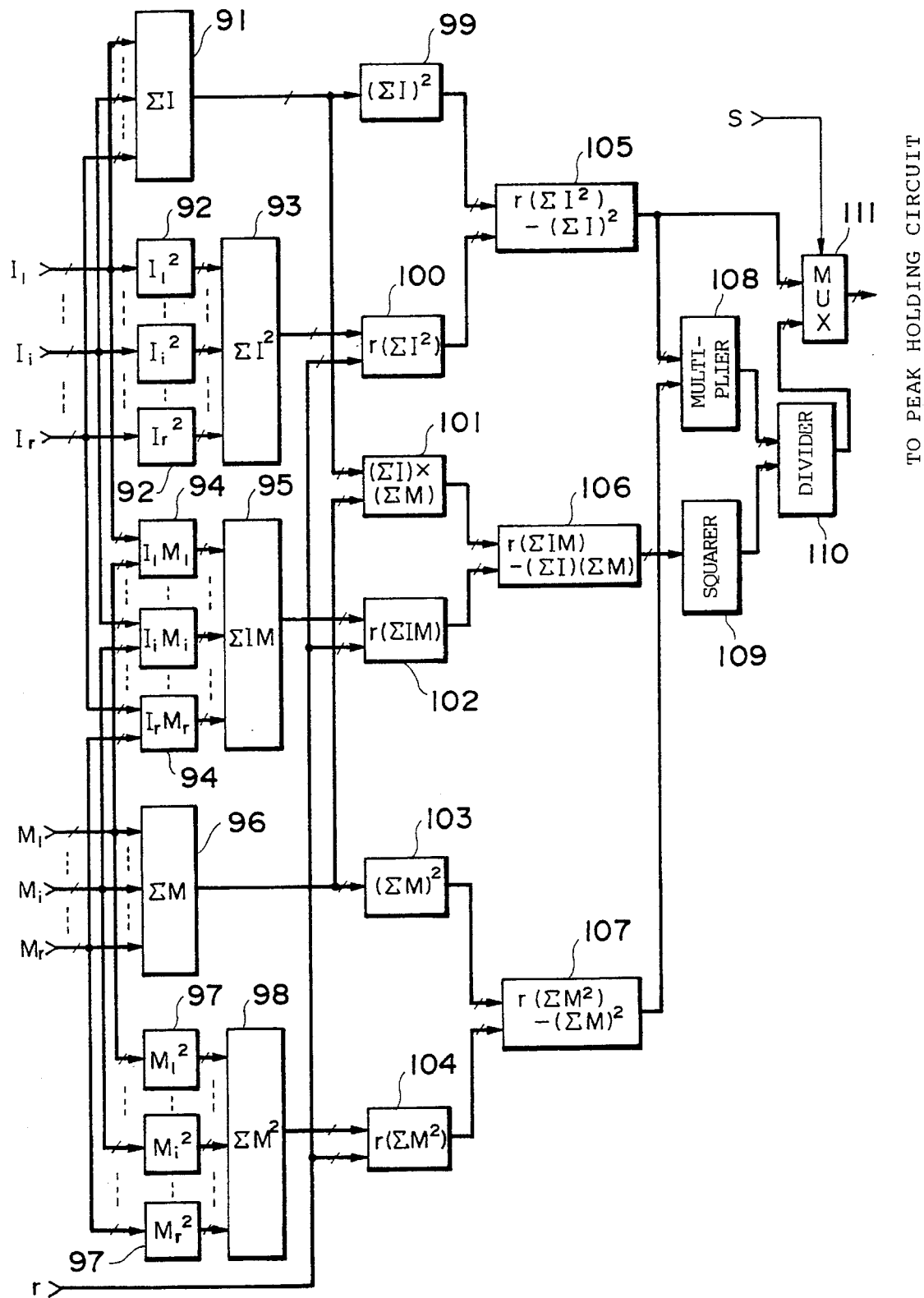
FIG. 22 is a block diagram illustrating a specific example of a cross-correlation calculating circuit.

FIG. 22 illustrates an example of the construction of the correlation-value calculating circuit.

The sum ΣI of the restored image data $I_i$ is calculated by an adder circuit 91, and the square of the sum $(\Sigma I)^2$ is calculated in a squaring circuit 99. The square $I_i^2$ of each item of restored image data $I_i$ is calculated by r-number of squaring circuits 92, and the sum $\Sigma I^2$ of the squares is calculated in an adder circuit 93.

The product $I_i M_i$ of the restored image data $I_i$ and the text data $M_i$ corresponding thereto is calculated in respective ones of r-number of multiplier circuits 94, and the sum ΣIM of these products is calculated in an adder circuit 95.

With regard also to the text data $M_i$, the sum ΣM of the text data $M_i$ is calculated in an adder circuit 96 and the square $(\Sigma M)^2$ of this sum is calculated by a squaring circuit 103, in the same manner as the restored image data $I_i$. The squares $M_i^2$ of these items of text data $M_i$ are calculated in respective ones of r-number of squaring circuits 97, and the sum $\Sigma M^2$ of these squares $M_i^2$ is calculated in an adder circuit 98.

The product (ΣI)(ΣM) of the sum ΣI of the restored image data obtained from the adder circuit 91 and the sum ΣM of the text data obtained from the adder circuit 96 is calculated by a multiplier circuit 101. Meanwhile, data representing the number r of small areas is provided by the CPU 17, and the product r(ΣIM) of the number r and the value ΣIM obtained from the adder circuit 95 is calculated by a multiplier circuit 102. The difference between the output of the multiplier circuit 102 and the output of the multiplier circuit 101 is calculated by a subtractor circuit 106, and the square of the result of the subtraction opration is calculated by a squaring circuit 109, whereby the numerator of Equation (7) is obtained.

The product $r(\Sigma I^2)$ of the output $\Sigma I^2$ of adder circuit 93 and the number r of small areas is calculated by a multiplier circuit 100, and the output $(\Sigma I)^2$ of the squaring circuit 99 is subtracted from this product by a subtractor circuit 105. Similarly, the product $r(\Sigma M^2)$ of the output $\Sigma M^2$ of adder circuit 98 and the number r of small areas is calculated by a multiplier circuit 104, and the output $(\Sigma M)^2$ of the squaring circuit 103 is subtracted from this product by a subtractor circuit 107. The results of subtraction performed by these subtractor circuits 105, 107 are multiplied together by a multiplier circuit 108, whereby the denominator of Equation (7) is obtained.

The output of the squaring circuit 109 is divided by the output of the multiplier circuit 108 in a divider circuit 110, whereby the value $R^2$ on the left side of Equation (7) is obtained.

A multiplexer 111 selects one of the outputs of the subtractor circuit 105 and the divider circuit 110 in accordance with a selection signal S applied thereto. In any case, the square $R^2$ of the correlation value obtained by the divider circuit 110 is applied to the corresponding peak holding circuit through the multiplexer 111.

The processing for calculating the correlation value is executed during one period of the clock, and the correlation value R is obtained for the window WN at each and every position.

It goes without saying that processing equivalent to that of the arithmetic circuitry (hardware circuitry) shown in FIG. 22 is capable of being executed by a computer programmed so as to execute this processing. This is applicable also to the processing in the other circuit blocks illustrated in FIG. 1, FIG. 13 or FIG. 21.

Second Embodiment

Figure 23:
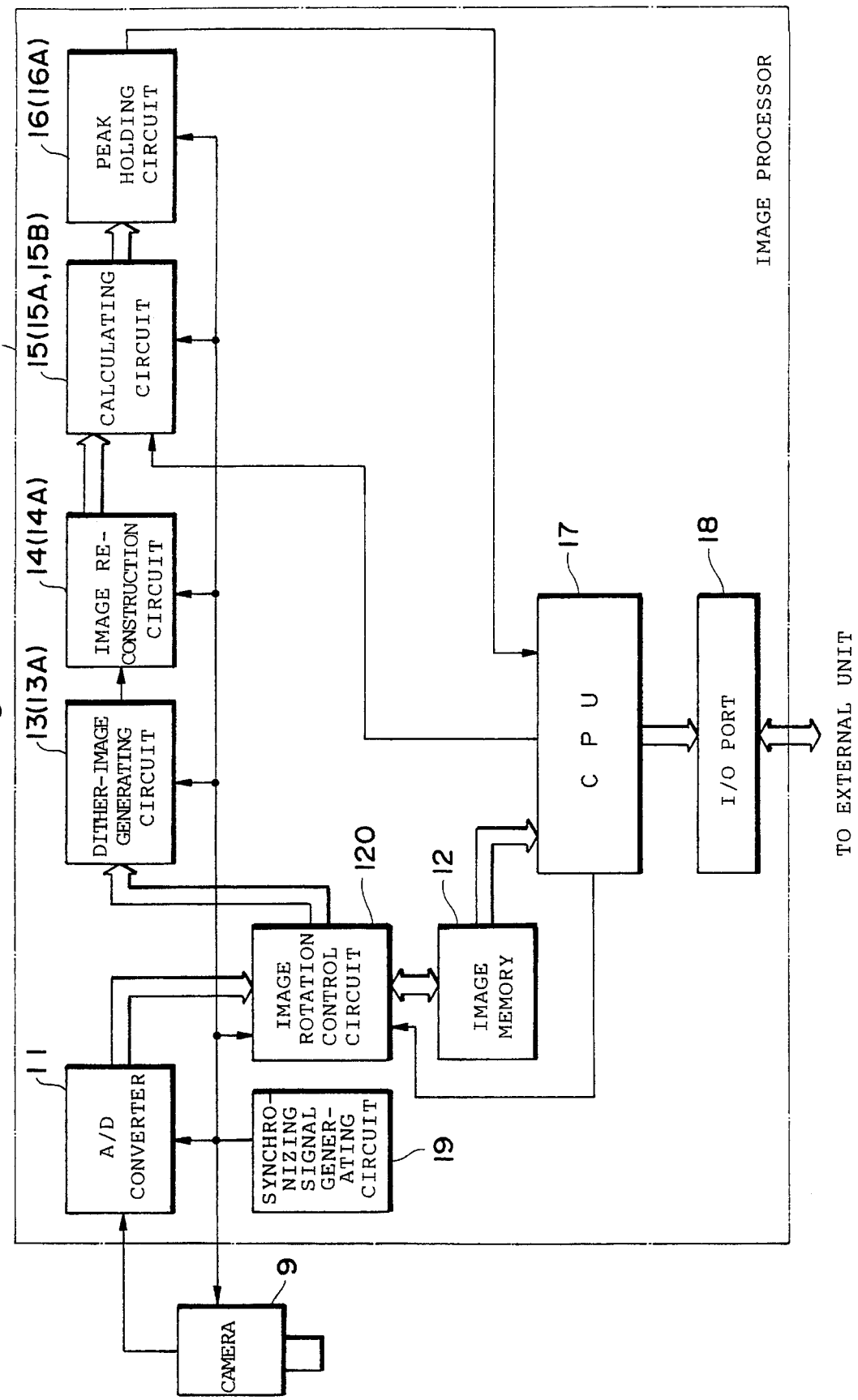
FIG. 23 is a block diagram illustrating the overall configuration of an image processor according to a second embodiment.

FIG. 23 illustrates the overall configuration of an image processor 10C according to a second embodiment. This image processor 10C differs from those of the first embodiment (inclusive of its variations) shown in FIGS. 1, 13 and 21 in that an image rotation control circuit 120 is provided, and in that a single pair of a difference calculating circuit 15 (or 15A, or correlation-value calculating circuit 15B) and a peak holding circuit 16 (or 16A) are connected in place of the plurality pairs of these circuits.

Figure 24:
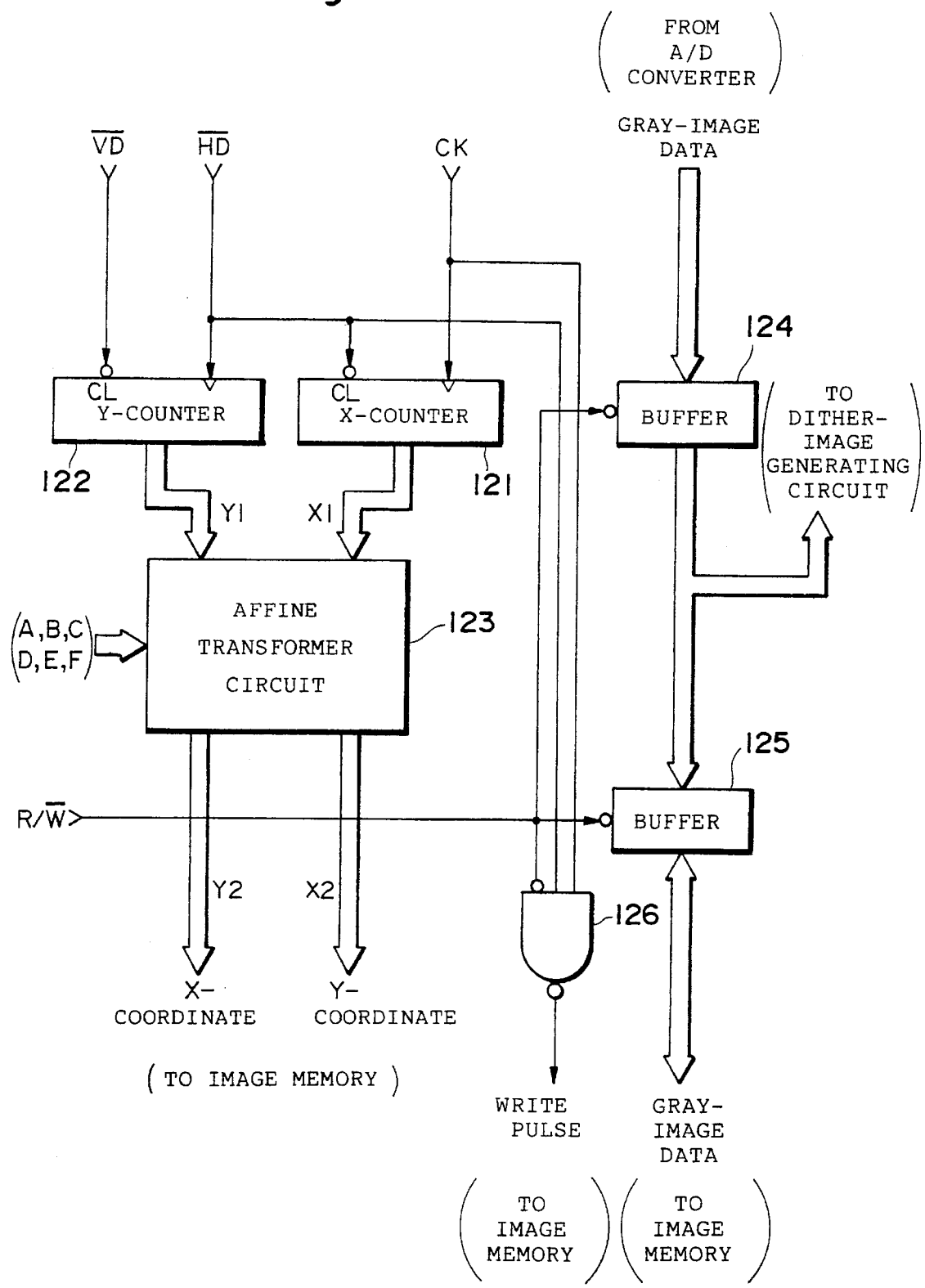
FIG. 24 is a block diagram illustrating a detailed construction of an image rotation control circuit shown in FIG. 23.

FIG. 24 shows a specific example of the constructrion of the image rotation control circuit 120 which performs an affine transformation to rotate the image data. The affine transformation from X1, Y1 to X2, Y2 are expressed as follows:

$$\begin{pmatrix} X2 \\ Y2 \end{pmatrix} = \begin{pmatrix} A & B & C \\ D & E & F \end{pmatrix} \begin{pmatrix} X1 \\ Y1 \\ 1 \end{pmatrix} \quad \text{Eq. (8)}$$

In a case where the image is rotated by an angle θ around a center $(X_0, Y_0)$, the parameters A to F are set as follows:

$A = \cos\theta$ $B = -\sin\theta$ $C = X_0 - \cos\theta \cdot X_0 + \sin\theta \cdot Y_0$ $D = \sin\theta$ $E = \cos\theta$ $F = Y_0 - \sin\theta \cdot X_0 - \sin\theta \cdot Y_0$     Eq. (9)

In a case where the image is desired to be enlarged α times, the parameters should be selected as follows:

$A = 1/\alpha$ $B = C = D = 0$ $E = 1/\alpha$ $F = 0$     Eq. (10)

In a case where the image is tranformed into a reduced image which is one-αth as small as the original image, the parameters are set as follows:

$A = \alpha$ $B = C = D = 0$ $E = \alpha$ $F = 0$     Eq. (11)

When the image is maintained as is, the parameters are defined as follows:

$A = E = 1$ $B = C = D = F = 0$     Eq. (12)

In the circuit shown in FIG. 24, the gray image data supplied from the A/D converter 11 is written in the image memory 12 as is, i.e., without the affine transformation. When the image data is read out of the image memory the affine transformation is performed and transformed image data is transferred to the dither-image generating circuit 13 (or the pseudo-gray-level image generating circuit 13A). The affine transformation of the image is attained by the affine transformation of addresses (X and Y coordinates) of the image data.

An X counter 121 is cleared by the horizontal synchronizing signal $\overline{HD}$ and then counts the clock signal CK input thereto from this point in time onward. Accordingly, the count X1 in the X counter 121 represents the X coordinate of the image data. A Y counter 122 is cleared by the vertical synchronizing signal $\overline{VD}$ and then counts the horizontal synchronizing signal $\overline{HD}$ input thereto from this point in time onward. Accordingly, the count Y1 in the Y counter 122 represents the Y coordinate of the image data. These counts X1 and Y1 are fed to an affine transformer circuit 123.

The parameters A to F are applied to the affine transformer circuit 123 by the CPU 17. When the image data is written in the image memory 12, the parameters A to F expressed by Equation (12) are set in the affine transformer circuit 123. Accordingly, X, Y-coordinates X2, Y2, which are the same as the input X1, Y1, respectively, are outputted from the affine transformer circuit 123. When the image data is read from the image memory 12 and the image is rotated by θ, the parameters expressed by Equation (9) is given to the circuit 123. The coordinates X2 and Y2 transformed in accordance with Equation (9) are outputted from the affine transformer circuit 123. The coordinates data X2 and Y2 are used as addresses for accessing the image memory 12. The affine transformer circuit 123 may be realized by hardware or software.

A buffer circuit 124 is a one-directional buffer and a buffer circuit 125 is a bi-directional buffer. These buffer circuits 124 and 125 are enabled by a read/write signal R/$\overline{W}$ fed by the CPU 17. In the writing operation, the image data from the A/D converter 11 is transferred to the image memory 12 through the buffer circuits 124 and 125. Further, write pulses produced by a NAND circuit 126 in synchronism with the clock signal CK is fed to the image memory 12. In the reading operation, the image data read out of the image memory 12 is transferred to the dither-image generating circuit 13 through the bi-directional buffer circuit 125. The reading operation of the image data from the image memory 12 is also executed in synchronism with the clock signal CK.

In the image processor 10C shown in FIG. 23, the text data representing a single standard image, e.g., the standard image having a rotation angle of zero degree as shown in FIG. 5 is registered in the difference calculating circuit 15.

The video camera 9 sequentially outputs video signals representing the same subject images at predetermined time intervals, e.g., field intervals (1/60 sec.) or frame intervals (2/60 sec.). The video signals are converted into image data by the A/D converter 11 in sequence to be fed to the image memory 12 through the image rotation control circuit 120. Alternatively, a video signal representing a frame of the subject image is outputted from the video camera 9 and is converted into image data of one frame to be stored in a frame (field) memory. The image data is read from the frame memory repeatedly at predetermined time intervals to be fed to the image memory 12 through the image rotation control circuit 120.

A pattern-matching processing in the calculating circuit 15 is repeated at predetermined time intervals. In the first period, the image data picked up by the camera 9 is applied to the dither-image generating circuit 13 through the image rotation control circuit 120 without any rotation. The minimum difference value in one picture obtained by the pattern matching with the standard image is outputted from the peak holding circuit 16 to be fed to the CPU 17. In the second period, the image data to be fed to the dither-image generating circuit 13 is rotated through the image rotation control circuit 120 by an angle θ1 (θ1 is an arbitrary angle). The image rotated by θ1 is compared with the standard image and the minimum difference value obtained by this comparison is fed to the CPU 17 from the peak holding circuit 16. In this way the pattern-matching processing is repeatedly executed while the rotational angle in the image rotational control circuit 120 is changed gradually as θ1, 2θ1, 3θ1 and so on. When the processings have been finished N times, N images having different rotation angles i·θ (i=0, 1, 2, ..., N−1) have been compared with the standard image and N minimum difference values (or N maximum difference values) are obtained.

The CPU 17 executes minimum operation of N minimum difference values and further compares the minimum operation result (which is a minimum value among the N minimum difference values) with a threshold value. If the minimum operation result is equal to or less than the threshold value, the CPU 17 decides that an image which coincides with the standard image is present in the image picked-up. Of course the CPU 17 can recognize the X, Y coordinates of the window WN in which the image matched with the standard image exists.

In accordance with the second embodiment, since only one pair of the calculating circuit 15 and peak holding circuit 16 is sufficient to perform pattern-matching processings with regard to the images having different rotational angle, the hardware construction of the image processor 10C is simplified, although a relatively long time is required to complete the processings.

Third Embodiment

FIG. 25 illustrates the overall configuration of an image processor 10D according to a third embodiment. The image processor 10D is provided with a plurality pairs of the difference calculating circuits 15a, 15b, 15c (or 15Aa, 15Ab, 15Ac, or correlation-value calculating circuits 15Ba, 15Bb, 15Bc) and peak holding circuits 16a, 16b, 16c (or 16Ac, 16Ab, 16Ac). However a number (three in FIG. 25) of pairs of the above circuits in the third embodiment is less than that in the first embodiment (inclusive of its variations). Further the image processor 10D of the third embodiment is provided with the image rotation control circuit 120.

The text data representing the standard image is registered in each of the calculating circuits 15a~15c. The standard images for the calculating circuits 15a~15c are the same, but have different rotational angles. For example, the standard images for the circuits 15a, 15b and 15c are of the rotational angles of 0, θ2 and 2θ2 degrees, respectively (θ2 is an arbitrary angle).

The pattern matching processing is repeated (β/3θ2)−1 times for one image picked-up while the picked-up image is rotated by an angle of 3θ2 for each processing through the image rotation control circuit 120. That is, in the first processing the picked-up image is not rotated (i.e., rotational angle is zero). The rotational angles are 3θ2, 6θ2, 9θ2, ... in the second processing and the succeeding processings. The angle β is a range of angles to be searched, e.g., β=360 degrees).

Alternatively, the rotation angles of the standard images for the calculation circuits 15a~15c are set to 0, 120 and 240 degrees, respectively in the case of β=360 degrees. The picked-up image by the camera 9 is rotated by the image rotation control circuit 120 by i·θ2 for each processing, where i is incremented with every processing from zero, i.e., i=0, 1, 2, 3, ..., (β/3θ2)−1.

In this way, the image picked-up is substantially compared with the standard images having rotation angles i·θ2 (i=0, 1, 2, ..., β/θ2−1). The CPU 17 judges whether or not the picked-up image coincides with any one of the standard images based on the minimum difference values (or maximum correlation values) fed from the peak holding circuits 16a~16c (or 16Aa~16Ac) in the same way as the first and second embodiments.

According to the third embodiment both the number of pairs of the circuits 15a~15c, 16a~16c and the number of processings to be executed are relatively small, so that the construction of the image processor 10D is relatively simplified in comparison with the first embodiment and the processing time is relatively short in comparison with the third embodiment.

As seen from Equations (10) and (11), the picked-up image can be enlarged or reduced by the image rotation control circuit 120. Accordingly, enlarged image or reduced image may be compared with, even enlarged and rotated or reduced and rotated image may be compared with the standard images.

As many apparently widely different embodiments of the present invention can be made without departing from the spirit and scope thereof, it is to be understood that the invention is not limited to the specific embodiments thereof except as defined in the appended claims.

What is claimed is:

1. An image processor comprising:

pseudo-gray-scale image generating circuit means for converting input image data, which is represented by a first prescribed number of bits per pixel, into pseudo-gray-scale image data represented by a second prescribed number of bits, which is less than said first prescribed number of bits;

image restoration circuit means for restoring the pseudo-gray-scale image data generated by said pseudo-gray-scale image generating circuit means for each and every one of a plurality of small areas, each of which comprises a plurality of pixels, with said each small area serving as one restored pixel, and outputting restored image data; and a plurality of similarity operating circuit means, which operate in parallel, each for calculating an index value representing a degree of similarity between the restored image data outputted by said image restoration circuit means and text data representing a standard image set in advance, the standard images for the plurality of similarity operating circuit means being different from one another.

2. An image processor according to claim 1, wherein the standard images are images of models which are different from one another.

3. An image processor according to claim 1, wherein the standard images are formed based on a single model and different in rotational angle or in size from one another.

4. An image processor according to claim 1 further comprising judging means for determining whether a subject image represented by the input image data coincides with at least one of the standard images on the basis of the index values calculated by the plurality of said similarity operating circuit means.

5. An image processor according to claim 1, wherein said pseudo-gray-scale image generating circuit means binarizes the input image data using an error diffusion method and generates dither image data represented by one bit per pixel.

6. An image processor according to claim 1, wherein said pseudo-gray-scale image generating circuit means subjects the input image data to a four-value conversion using an error diffusion method and generates pseudo-gray-scale image data represented by two bits per pixel.

7. An image processor according to claim 1, wherein said image restoration circuit means restores the pseudo-gray-scale image data for each and every one of a plurality of small areas, each of which is provided in a window that scans the pseudo-gray-scale image generated by said pseudo-gray-scale image generating circuit means, and outputting restored image data for a window at each and every position; and said similarity operating circuit means calculates the index value representing a degree of similarity between the restored image data of each window sequentially outputted by the image restoration circuit means and text data representing a standard image set in advance.

8. An image processor according to claim 7, further comprising a plurality of peak holding circuit means each for detecting an index value, which represents the highest degree of similarity, from among similarity index values regarding each of the windows obtained from said corresponding similarity operating circuit means, and position data indicative of the window in which this index value is generated.

9. An image processor according to claim 8, further comprising judging means for determining whether a subject image represented by the input image data has an image portion which coincides with at least one of the standard images on the basis of the index values detected by the plurality of said peak holding circuit means.

10. An image processor according to claim 7, wherein the index value representing said degree of similarity is a difference value in lightness of the image, and said similarity operating circuit means calculates an absolute value of a difference between restored image data and corresponding text data for each and every small area, sums the absolute values of these differences over all small areas contained in one window and outputs the sum value as a difference value of lightness.

11. An image processor according to claim 10, further comprising a peak holding circuit means for detecting a smallest difference value from among difference values of lightness regarding each of the windows obtained by said similarity operating circuit means, as well as position data indicative of the window in which the smallest difference value is produced.

12. An image processor according to claim 7, wherein said similarity operating circuit means calculates a cross-correlation value between restored image data and text data for each and every window, and outputs this cross-correlation value as the index value representing degree of similarity.

13. An image processor according to claim 12, further comprising a peak holding circuit means for detecting a largest cross-correlation value from among the cross-correlation values regarding each of the windows obtained by said similarity operating circuit means, as well as position data indicative of the window in which the largest cross-correlation value is produced.

14. An image processor comprising:

converting means for converting input image data into image data representing images different in rotational angle or in size from the image represented by the input image data in sequence at a predetermined period of time;

pseudo-gray-scale image generating circuit means for converting the image data converted by said converting means and represented by a first prescribed number of bits per pixel, every time the converted image data is supplied from said converting means, into pseudo-gray-scale image data represented by a second prescribed number of bits, which is less than said first prescribed number of bits;

image restoration circuit means for restoring the pseudo-gray-scale image data for each and every one of a plurality of small areas, each of which comprises a plurality of pixels, with said each small area serving as one restored pixel, every time the pseudo-gray-scale image data is supplied from said pseudo-gray-scale image generating circuit means and outputting restored image data; and similarity operating circuit means for calculating an index value representing a degree of similarity between the restored image data and text data representing a standard image set in advance, every time the restored image data is outputted by said image restoration circuit means.

15. An image processor according to claim 14, further comprising judging means for determining whether a subject image represented by the input image data coincides with at least one of the standard images on the basis of the index values calculated in sequence by said similarity operating circuit means.

16. An image processor according to claim 14, wherein said pseudo-gray-scale image generating circuit means binarizes the converted image data using an error diffusion method and generates dither image data represented by one bit per pixel.

17. An image processor according to claim 14, wherein said pseudo-gray-scale image generating circuit means subjects the converted image data to a four-value conversion using an error diffusion method and generates pseudo-gray-scale image data represented by two bits per pixel.

18. An image processor according to claim 14, wherein said image restoration circuit means restores the pseudo-gray-scale image data for each and every one of a plurality of small areas, each of which is provided in a window that scans the pseudo-gray-scale image generated by said pseudo-gray-scale image generating circuit means, and outputting restored image data for a window at each and every position; and said similarity operating circuit means calculates the index value representing a degree of similarity between the restored image data of each window sequentially outputted by the image restoration circuit means and text data representing a standard image set in advance.

19. An image processor according to claim 18, further comprising peak holding circuit means for detecting an index value, which represents the highest degree of similarity, from among similarity index values regarding each of the windows obtained from said similarity operating circuit means, and position data indicative of the window in which this index value is generated in every predetermined period of time.

20. An image processor according to claim 19, further comprising judging means for determining whether a subject image represented by the input image data has an image portion which coincides with at least one of the standard images on the basis of the index values detected by said peak holding circuit means.

21. An image processor according to claim 18, wherein the index value representing said degree of similarity is a difference value in lightness of the image, and said similarity operating circuit means calculates an absolute value of a difference between restored image data and corresponding text data for each and every small area, sums the absolute values of these differences over all small areas contained in one window and outputs the sum value as a difference value of lightness.

22. An image processor according to claim 21, further comprising a peak holding circuit means for detecting a smallest difference value from among difference values of lightness regarding each of the windows obtained by said similarity operating circuit means, as well as position data indicative of the window in which the smallest difference value is produced.

23. An image processor according to claim 18, wherein said similarity operating circuit means calculates a cross-correlation value between restored image data and text data for each and every window, and outputs this cross-correlation value as the index value representing degree of similarity.

24. An image processor according to claim 23, further comprising a peak holding circuit means for detecting a largest cross-correlation value from among the cross-correlation values regarding each of the windows obtained by said similarity operating circuit means, as well as position data indicative of the window in which the largest cross-correlation value is produced.

25. An image processor comprising:

converting means for converting input image data into image data representing images different in rotational angle or in size from the image represented by the input image data in sequence at a predetermined period of time;

pseudo-gray-scale image generating circuit means for converting the image data converted by said converting means and represented by a first prescribed number of bits per pixel, every time the converted image data is supplied from said converting means, into pseudo-gray-scale image data represented by a second prescribed number of bits, which is less than said first prescribed number of bits;

image restoration circuit means for restoring the pseudo-gray-scale image data for each and every one of a plurality of small areas, each of which comprises a plurality of pixels, with said each small area serving as one restored pixel, every time the pseudo-gray-scale image data is supplied from said pseudo-gray-scale image generating circuit means and outputting restored image data; and a plurality of similarity operating circuit means, which operate in parallel, each for calculating an index value representing a degree of similarity between the restored image data and text data representing a standard image set in advance, every time the restored image data is outputted by said image restoration circuit means, the standard images for the plurality of similarity operating circuit means being formed based on a single model and different in rotational angle or in size from one another.

26. An image processor accoring to claim 25, further comprising judging means for determining whether a subject image represented by the input image data coincides with at least one of the standard images on the basis of the index values calculated in sequence by the plurality of said similarity operating circuit means.

27. An image processor according to claim 25, wherein said pseudo-gray-scale image generating circuit means binarizes the converted image data using an error diffusion method and generates dither image data represented by one bit per pixel.

28. An image processor according to claim 25, wherein said pseudo-gray-scale image generating circuit means subjects the converted image data to a four-value conversion using an error diffusion method and generates pseudo-gray-scale image data represented by two bits per pixel.

29. An image processor according to claim 25, wherein said image restoration circuit means restores the pseudo-gray-scale image data for each and every one of a plurality of small areas, each of which is provided in a window that scans the pseudo-gray-scale image generated by said pseudo-gray-scale image generating circuits means, and outputs restored image data for a window at each and every position; and said similarity operating circuit means calculates the index value representing a degree of similarity between the restored image data of each window sequentially outputted by the image restoration circuit means and text data representing a standard image set in advance.

30. An image processor according to claim 29, further comprising a plurality of peak holding circuit means each for detecting an index value, which represents the highest degree of similarity, from among similarity index values regarding each of the windows obtained from said corresponding similarity operating circuit means, and position data indicative of the window in which this index value is generated in every predetermined period of time.

31. An image processor according to claim 30, further comprising judging means for determining whether a subject image represented by the input image data has an image portion which coincides with at least one of the standard images on the basis of the index values detected by the plurality of said peak holding circuit means.

32. An image processor according to claim 29, wherein the index value representing said degree of similarity is a difference value in lightness of the image, and said similarity operating circuit means calculates an absolute value of a difference between restored image data and corresponding text data for each and every small area, sums the absolute values of these differences over all small areas contained in one window, and outputs the sum value as a difference value of lightness.

33. An image processor according to claim 32, further comprising a peak holding circuit means for detecting a smallest difference value from among difference values of lightness regarding each of the windows obtained by said similarity operating circuit means, as well as position data indicative of the window in which the smallest difference value is produced.

34. An image processor according to claim 29, wherein said similarity operating circuit means calculates a cross-correlation value between restored image data and text data for each and every window, and outputs this cross-correlation value as the index value representing degree of similarity.

35. An image processor according to claim 34, further comprising a peak holding circuit means for detecting a largest cross-correlation value from among the cross-correlation values regarding each of the windows obtained by said similarity operating circuit means, as well as position data indicative of the window in which the largest cross-correlation value is produced.

36. An image processing method comprising the steps of:
converting input image data of one frame, which is represented by a first prescribed number of bits per pixel, into pseudo-gray-scale image data of one frame represented by a second prescribed number of bits, which is less than the first prescribed number of bits;

summing the pseudo-gray-scale image data for each and every one of a plurality of small areas, each of which comprises a plurality of pixels and is provided in a window that scans the pseudo-gray-scale image generated, thereby restoring the image data for a window at each and every position, with said each small area serving as one restored pixel; and calculating index values with use of text data of a plurality of standard images which are different from one another for each restored image data of the plurality of frames in parallel, the index value representing a degree of similarity between the restored image data of each window and text data representing the standard image set in advance.

37. An image processing method according to claim 36, further comprising the step of judging whether a subject image represented by the input image data coincides with at least one of the standard images on the basis of the index values calculated.

38. An image processing method comprising the steps of:
converting input image data of one frame into image data representing images of a plurality of frames different in rotational angle or in size from the image represented by the input image data in sequence at a predetermined period of time;

converting the image data of one frame converted by above converting step and represented by a first prescribed number of bits per pixel, every time the converted image data of one frame is supplied, into pseudo-gray-scale image data of one frame represented by a second prescribed number of bits, which is less than the first prescribed number of bits;

summing said pseudo-gray-scale image data of one frame for each and every one of a plurality of small areas, each of which comprises a plurality of pixels and is provided in a window that scans the pseudo-gray-scale image generated, thereby restoring the image data for a window at each and every position, with said each small area serving as one restored pixel, every time the pseudo-gray-scale image data of one frame is supplied; and calculating an index value representing a degree of similarity between the restored image data of each window and text data representing a standard image set in advance every time the restored image data of one frame is supplied.

39. An image processing method according to claim 38, further comprising the step of judging whether a subject image represented by the input image data coincides with at least one of the standard images on the basis of the index values calculated and supplied in sequence.

40. An image processing method comprising the steps of:
converting input image data of one frame into image data representing images of a plurality of frames different in rotational angle or in size from the image represented by the input image data in sequence at a predetermined period of time;

converting the image data of one frame converted by the above converting step and represented by a first prescribed number of bits per pixel, every time the converted image data of one frame is supplied, into pseudo-gray-scale image data of one frame represented by a second prescribed number of bits, which is less than the first prescribed number of bits;

summing said pseudo-gray-scale image data of one frame for each and every one of a plurality of small areas, each of which comprises a plurality of pixels and is provided in a window that scans the pseudo-gray-scale image generated, thereby restoring the image data for a window at each and every position, with said each small area serving as one restored pixel, every time the pseudo-gray-scale image data of one frame is supplied; and calculating index values with use of text data of a plurality of standard images which are formed based on a single model and different in rotational angle or in size from one another for each restored image data of the plurality of frames in parallel and every time the restored image data is supplied, the index value representing a degree of similarity between the restored image data of each window and text data representing the standard image set in advance.

41. An image processing method according to claim 40, further comprising the step of judging whether a subject image represented by the input image data coincides with at least one of the standard images on the basis of the index values and supplied in parallel and every time the index value is calculated.

* * * * *